US012170877B2

(12) United States Patent
Xu et al.

(10) Patent No.: US 12,170,877 B2
(45) Date of Patent: Dec. 17, 2024

(54) PACKAGE STRUCTURE OF MICRO SPEAKER AND METHOD FOR FORMING THE SAME

(71) Applicant: Fortemedia, Inc., Santa Clara, CA (US)

(72) Inventors: Yu-Xuan Xu, Hsinchu (TW); Shih-Chin Gong, Taipei (TW)

(73) Assignee: FORTEMEDIA, INC., Alviso, CA (US)

( * ) Notice: Subject to any disclaimer, the term of this patent is extended or adjusted under 35 U.S.C. 154(b) by 190 days.

(21) Appl. No.: 18/064,426

(22) Filed: Dec. 12, 2022

(65) Prior Publication Data

US 2024/0196134 A1 Jun. 13, 2024

(51) Int. Cl.

| | |
|---|---|
| ***H04R 9/04*** | (2006.01) |
| ***H04R 1/02*** | (2006.01) |
| ***H04R 7/06*** | (2006.01) |
| ***H04R 7/18*** | (2006.01) |
| ***H04R 9/02*** | (2006.01) |
| ***H04R 9/06*** | (2006.01) |
| ***H04R 31/00*** | (2006.01) |

(52) U.S. Cl.
CPC ............. *H04R 9/047* (2013.01); *H04R 1/025* (2013.01); *H04R 7/06* (2013.01); *H04R 7/18* (2013.01); *H04R 9/025* (2013.01); *H04R 9/06* (2013.01); *H04R 31/003* (2013.01); *H04R 31/006* (2013.01); *H04R 2201/003* (2013.01); *H04R 2307/025* (2013.01)

(58) Field of Classification Search
CPC .......... H04R 9/047; H04R 1/025; H04R 7/06; H04R 7/18; H04R 9/06; H04R 31/003; H04R 31/006; H04R 9/025; H04R 2201/003; H04R 2307/025
USPC ....... 381/423, 398, 400, 399, 408, 410, 424, 381/426
See application file for complete search history.

(56) References Cited

U.S. PATENT DOCUMENTS

| | | | | |
|---|---|---|---|---|
| 7,534,640 | B2 * | 5/2009 | Sasagawa | B81C 1/00595 438/50 |
| 2005/0220320 | A1 * | 10/2005 | Kim | H04R 9/047 381/396 |
| 2014/0233785 | A1 * | 8/2014 | Jeong | H04R 1/02 381/386 |
| 2020/0344551 | A1 * | 10/2020 | Chen | H01F 27/2804 |

* cited by examiner

*Primary Examiner* — Norman Yu
(74) *Attorney, Agent, or Firm* — McClure, Qualey & Rodack, LLP

(57) ABSTRACT

A package structure of a micro speaker includes a substrate having a hollow chamber. A diaphragm is disposed on the top surface of the substrate. The diaphragm includes a first portion suspended over the hollow chamber and a second portion surrounding the first portion. In a plan view, the second portion of the diaphragm and the hollow chamber do not overlap. A coil is embedded in the first portion of the diaphragm. At least one dummy structure is embedded in the second portion of the diaphragm, and it is electrically isolated from the coil structure by the diaphragm. A carrier board is disposed on the bottom surface of the substrate. A permanent magnetic element is disposed on the carrier board and in the hollow chamber. A package lid is wrapped around the substrate and the diaphragm, and has a lid opening that exposes a portion of the diaphragm.

20 Claims, 21 Drawing Sheets

PACKAGE STRUCTURE OF MICRO SPEAKER AND METHOD FOR FORMING THE SAME

BACKGROUND OF THE INVENTION

Field of the Invention

The invention relates in general to a micro speaker, and in particular to a package structure of a micro speaker and a method for forming the same.

Description of the Related Art

Since electronic products are becoming smaller and thinner, how to scale down the size of electronic products has become an important topic. Micro electromechanical system (MEMS) technology is a technology that combines semiconductor processing and mechanical engineering, which can effectively reduce the size of components and produce multi-functional micro elements and micro systems.

The manufacturing of traditional moving coil speakers has become quite mature, but the traditional moving coil speakers have a larger size and volume. If a micro electromechanical system (MEMS) process is used to manufacture a moving coil speaker on a semiconductor chip, the size and volume will be reduced. However, in addition to reducing the size to facilitate manufacturing, it is still necessary to develop a micro moving coil speaker with better performance and reliability.

BRIEF SUMMARY OF THE INVENTION

An embodiment of the invention provides a package structure of a micro speaker. The package structure includes a substrate, a diaphragm, a coil structure, at least one dummy structure, a carrier board, a first permanent magnetic element, and a package lid. The substrate has a hollow chamber. The diaphragm is disposed on the top surface of the substrate, wherein the diaphragm includes a first portion suspended over the hollow chamber and a second portion surrounding the first portion. In a plan view, the second portion of the diaphragm and the hollow chamber do not overlap. The coil structure is embedded in the first portion of the diaphragm. The dummy structure is embedded in the second portion of the diaphragm, and is electrically isolated from the coil structure by the diaphragm. The carrier board is disposed on the bottom surface of the substrate opposite the top surface. The first permanent magnetic element is disposed on the carrier board and in the hollow chamber. The package lid is wrapped around the substrate and the diaphragm. The package lid has a lid opening that exposes a portion of the top surface of the diaphragm.

In some embodiments, the diaphragm includes polydimethylsiloxane (PDMS), phenolic epoxy resin, polyimide, or a combination thereof.

In some embodiments, in a vertical direction that is perpendicular to the top surface of the substrate, the thickness of the dummy structure is equal to the thickness of the coil structure.

In some embodiments, the dummy structure comprises a semiconductor material, a dielectric material, a metal material, or a combination thereof.

In some embodiments, the coil structure has a multi-layered structure, including a first metal layer, a second metal layer, and a dielectric layer interposed between the first metal layer and the second metal layer.

In some embodiments, the dummy structure has the same multi-layered structure as the coil structure.

In some embodiments, in a vertical direction along which the first metal layer, the dielectric layer, and the second metal layer of the coil structure are stacked, the thickness of the dummy structure is equal to the thickness of the coil structure.

In some embodiments, there are a plurality of dummy structures evenly distributed in the second portion of the diaphragm.

In some embodiments, each of the dummy structures has a square, rectangular, circular, hexagonal or curved shape.

In some embodiments, the dummy structure comprises a single and continuous dummy structure having a shape corresponding to the shape of the second portion of the diaphragm.

In some embodiments, the coil structure comprises a first metal layer and a second metal layer. The first metal layer has a spiral structure surrounding the central axis of the diaphragm, and the second metal layer crosses over the spiral structure of the first metal layer and is electrically connected to the first metal layer.

In some embodiments, the carrier board has at least one vent hole, and the vent hole is configured to allow the hollow chamber to communicate with the external environment.

In some embodiments, the package lid is made of a metal material having a magnetic permeability lower than $1.25\times10^{-4}$ H/m.

In some embodiments, the package structure further comprises a second permanent magnetic element disposed on the package lid, wherein the second permanent magnetic element is located below or above the lid opening.

In some embodiments, the package structure further comprises an etch stop layer disposed between the coil structure and the hollow chamber, wherein the etch stop layer overlaps the coil in a vertical direction that is perpendicular to the top surface of the substrate, and the etch stop layer is made of a metal material.

Another embodiment of the invention provides a method for forming a package structure of a micro speaker, including the following steps. The method includes forming a coil structure on the top surface of a substrate. The method includes forming at least one dummy structure on the top surface of the substrate. The method includes forming a diaphragm covering the coil structure and the dummy structure, wherein the coil structure is embedded in a first portion of the diaphragm, and the dummy structure is embedded in a second portion of the diaphragm surrounding the first portion. The dummy structure is electrically isolated from the coil structure by the diaphragm. The method includes forming a hollow chamber in the substrate. In a plan view, the coil structure is aligned with the hollow chamber, and the dummy structure and the hollow chamber do not overlap. The method includes attaching a carrier board to the bottom surface of the substrate opposite the top surface, wherein a first permanent magnetic element is mounted on the carrier board and positioned in the hollow chamber. The method includes mounting a package lid on the carrier board, wherein the package lid is wrapped around the substrate and the diaphragm. The package lid has a lid opening that exposes a portion of the diaphragm.

In some embodiments, forming the coil structure comprising: forming a first metal layer on the top surface of the substrate; forming a dielectric layer on the first metal layer; and forming a second metal layer on the dielectric layer.

Moreover, forming the dummy structure comprises forming the dummy structure having the same multi-layered structure as the coil structure.

In some embodiments, the coil structure and the dummy structure are formed by the same processes and the same materials.

In some embodiments, the coil structure and the dummy structure have the same thickness in a vertical direction that is perpendicular to the top surface of the substrate.

In some embodiments, forming the at least one dummy structure comprises uniformly forming a plurality of discrete dummy structures in the second portion of the diaphragm.

BRIEF DESCRIPTION OF DRAWINGS

Aspects of this disclosure are best understood from the following detailed description when read with the accompanying figures. It should be noted that, in accordance with common practice in the industry, various features are not drawn to scale. In fact, the dimensions of the various features may be arbitrarily increased or reduced for clarity of discussion.

DETAILED DESCRIPTION OF INVENTION

Figure 1A:
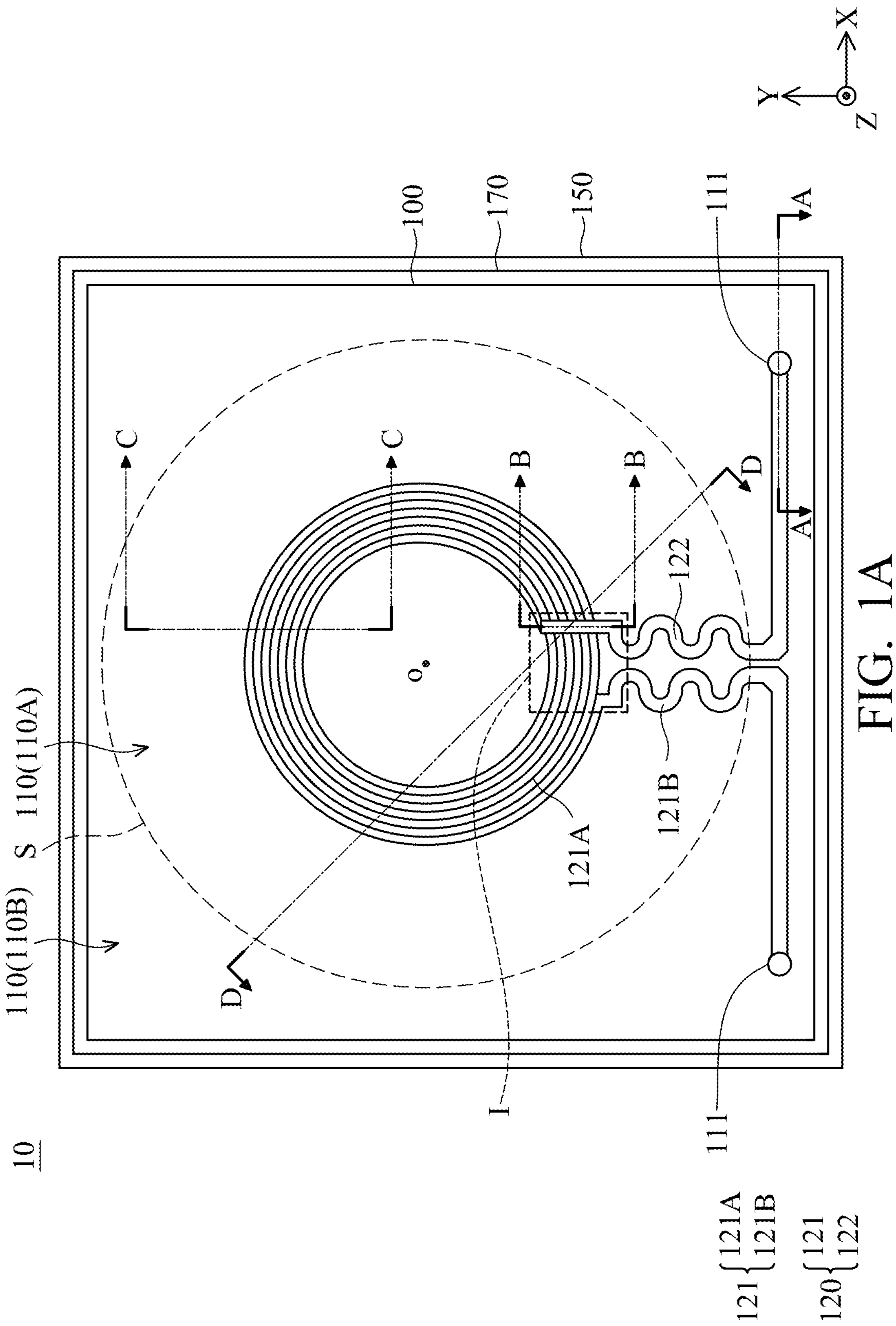
FIG. 1A illustrates a top view of a package structure of a micro speaker in accordance with some embodiments.

Embodiments of a package structure of a micro speaker and a method for forming the same are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In addition, the present disclosure may repeat reference numerals and/or letters in the various examples. This repetition is for the purpose of simplicity and clarity and does not in itself dictate a relationship between the various embodiments and/or configurations discussed. Some variations of embodiments are described below. In different figures and illustrated embodiments, similar element symbols are used to indicate similar elements.

FIG. 1A illustrates a top view of a package structure of a micro speaker 10 in accordance with some embodiments. The micro speaker 10 may be a moving coil speaker, and may be disposed in general electronic products. As shown in FIG. 1A, the package structure of the micro speaker 10 may mainly include a substrate 100, a diaphragm 110, a multi-layered coil structure 120 (hereinafter also referred to as a coil structure 120), a carrier board 150, and a package lid 170. It should be noted that the diaphragm 110 and the package lid 170 are only represented by rectangles in FIG. 1A in order to show internal structures of the package structure.

Figure 1B:
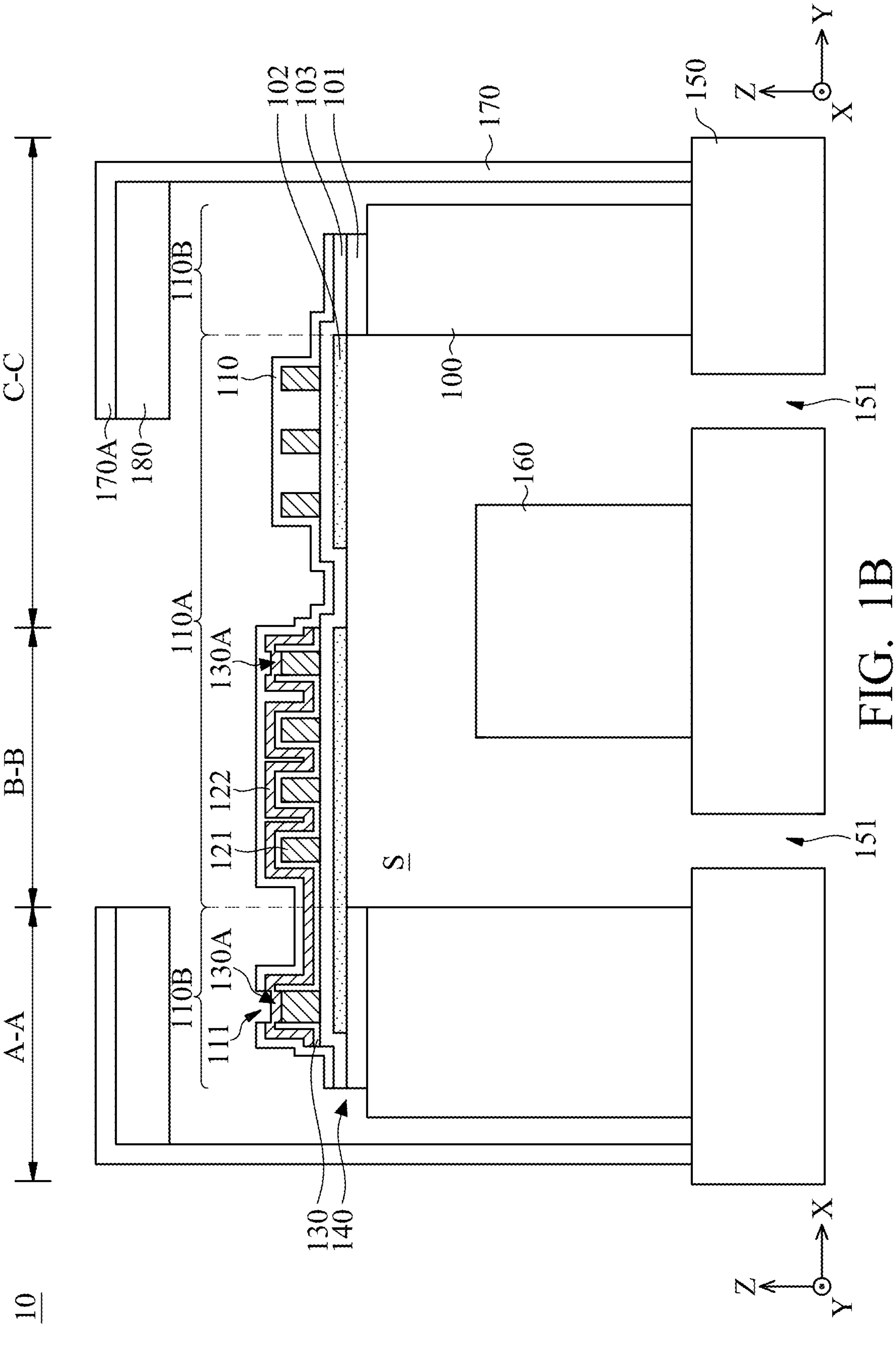
FIG. 1B illustrates a cross-sectional view of the package structure of the micro speaker shown in FIG. 1A in accordance with some embodiments.

FIG. 1B illustrates a cross-sectional view of the package structure of the micro speaker 10 shown in FIG. 1A in accordance with some embodiments. As shown in FIG. 1B, a hollow chamber S is formed in the substrate 100, which is also shown in dashed lines in FIG. 1A. The diaphragm 110 is disposed above the substrate 100, and it can elastically vibrate up and down in the normal direction of the substrate 100. Specifically, the diaphragm 110 includes a centrally located first portion 110A and a second portion 110B surrounding the first portion 110A. The second portion 110B is attached to the substrate 100 and is therefore a fixed part of the diaphragm 110, whereas the first portion 110A is suspended above the hollow chamber S of the substrate 100 and is therefore a movable part of the diaphragm 110. In a plan view (as shown in FIG. 1A), the first portion 110A of the diaphragm 110 overlaps the hollow chamber S, while the second portion 110B of the diaphragm 110 does not overlap the hollow chamber S (i.e., the second portion 110B is located outside the area of the hollow chamber S).

The coil structure 120 is embedded in the diaphragm 110, which means that the coil structure 120 is not exposed. As shown in FIG. 1A, the coil structure 120 is embedded in the first portion 110A of the diaphragm 110 (i.e., aligned with the hollow chamber S in plan view). The coil structure 120 is configured to transmit electric signals from a control unit (not shown), and drives the diaphragm 110 to deform relative to the substrate 100 according to the electric signals.

The multi-layered coil structure 120 may include a first metal layer 121 and a second metal layer 122 located above the first metal layer 121. For example, the first metal layer 121 and the second metal layer 122 are located on different horizontal planes, which may be parallel to the X-Y plane shown in FIG. 1B. The first metal layer 121 is electrically connected to the second metal layer 122 in an opening 111 (which will be further described later) of the diaphragm 110 to transmit electrical signals and control the operation of the micro speaker 10. At present, the resistance of speakers is mostly 802 or 3252, which is lower than that of single-layer coils. The multi-layered coils of the present disclosure can easily meet the resistance requirements.

As shown in FIG. 1A, in some embodiments, the first metal layer 121 includes a spiral structure 121A and a wavy structure 121B in plan view. The spiral structure 121A is disposed around the central axis O of the diaphragm 110, and the wavy structure 121B connects the spiral structure 121A to one of the openings 111 of the diaphragm 110 (see FIG. 1A, two openings 111 may be formed in the diaphragm 110). By providing the wavy structure 121B, the diaphragm 110 can be more flexible and the difficulty of the oscillation can be reduced. Additionally, the second metal layer 122 may also include a wavy structure in plan view.

Figure 2:
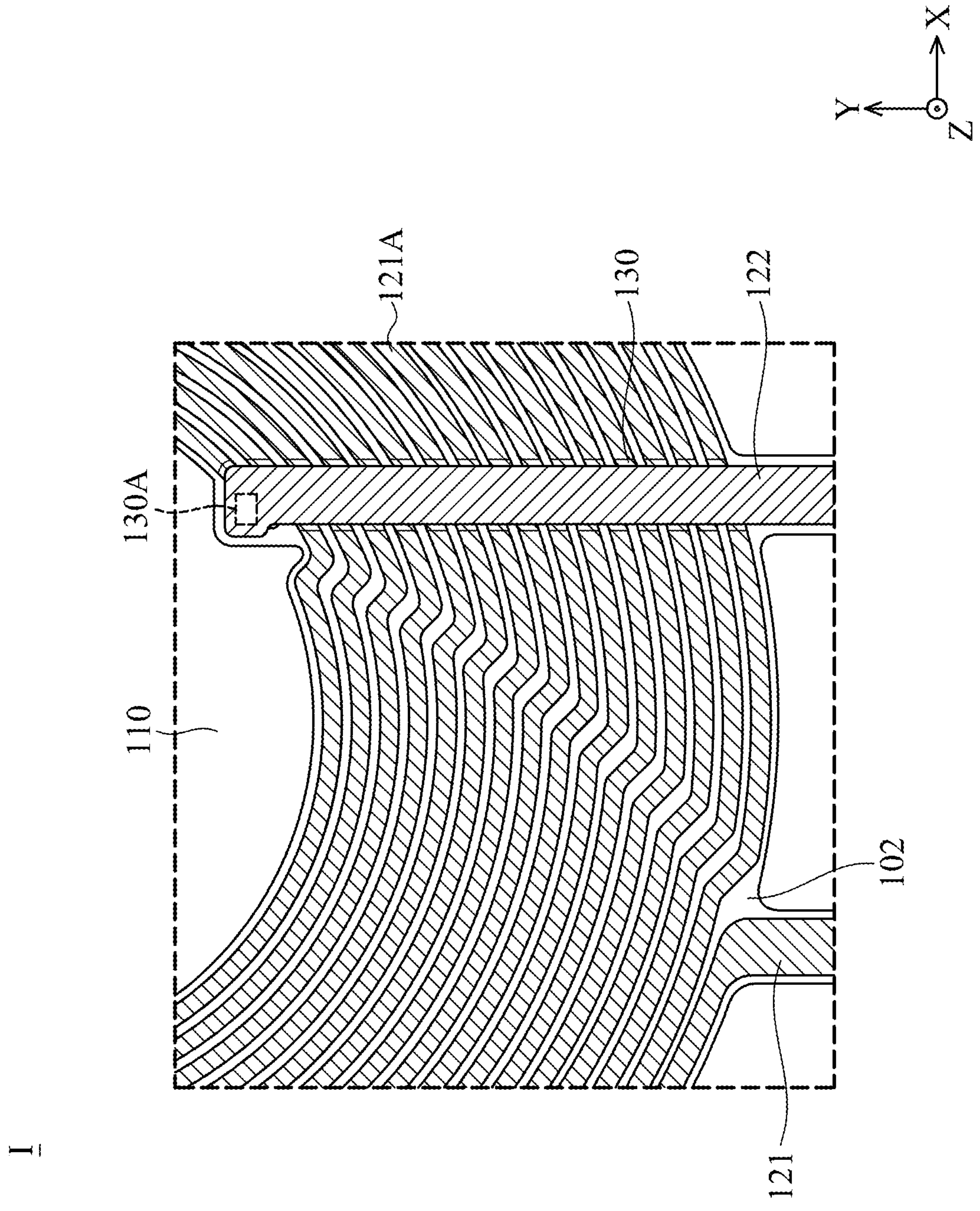
FIG. 2 illustrates an enlarged view of the area I shown in FIG. 1A in accordance with some embodiments.

Referring next to FIG. 2, which illustrates an enlarged view of the area I shown in FIG. 1A in accordance with some embodiments. As shown in FIG. 2, the second metal layer 122 crosses over the spiral structure 121A of the first metal layer 121, and a dielectric layer 130 is disposed between the first metal layer 121 and the second metal layer 122 to prevent a short circuit between the first metal layer 121 and the second metal layer 122. A through hole 130A can be formed in the dielectric layer 130 so that the first metal layer 121 is electrically connected to the second metal layer 122 through the through hole 130A.

In some embodiments, one or more dummy structures DS (see FIGS. 3E-1 and 4A to 4H) can also be formed or provided in the second portion 110B of the diaphragm 110 on the substrate 100 to enhance the flatness of the top surface of the diaphragm 110, which will be described in more detail later. The term "dummy structure" used herein refers to a structure that does not provide an electrical function. In some embodiments, the dummy structure(s) DS may comprise a semiconductor material (e.g., silicon), a dielectric material (e.g., an oxide), a metal material (e.g., aluminum, copper or the like), or a combination thereof.

Referring back to FIG. 1B, a first permanent magnetic element 160 may be disposed below the diaphragm 110, and a second permanent magnetic element 180 may be disposed above the diaphragm 112, in accordance with some embodiments. The term "permanent magnetic element" used herein refers to an element that can maintain magnetism for a long time. That is, the permanent magnetic element is not easy to lose magnetism and is not easy to be magnetized. In addition, permanent magnetic elements can also be referred to as "hard magnetic elements." The first permanent magnetic element 160 and the second permanent magnetic element 180 can attract each other to improve the frequency response of the diaphragm 110.

The above-mentioned components of the micro speaker 10 are arranged above the carrier board 150 (such as a printed circuit board (PCB)), and the package lid 170 (which may also be referred to a lid 170) is attached to the carrier board 150 to surround and protect the components of the micro speaker 10. The package lid 170 may have a lid opening 170A to allow acoustic energy due to vibration of the diaphragm 110 to travel out of the package structure of the micro speaker 10.

The detailed manufacturing process of the package structure of the micro speaker 10 will be described below.

FIGS. 3A, 3A-1, 3B, 3B-1, 3C, 3C-1, 3D, 3D-1, 3E, 3E-1, 3F, and 3G illustrate cross-sectional views of intermediate stages in the formation of the package structure of the micro speaker 10 (as discussed above) in accordance with some embodiments. It should be understood that FIGS. 3A, 3B, 3C, 3D, 3E, 3F, and 3G each include cross-sectional views along lines A-A, B-B, and C-C shown in FIG. 1A. In this way, the manufacturing processes of different parts of the package structure can be shown in a single figure. Two sets of coordinate axes are provided in FIGS. 3A-3G, wherein one set of coordinate axes in the left-hand side correspond the cross-sectional view along line A-A, and the other set of coordinate axes in the right-hand side correspond the cross-sectional views along lines B-B and C-C. Moreover, FIGS. 3A-1, 3B-1, 3C-1, 3D-1, and 3E-1 are cross-sectional views along the line D-D shown in FIG. 1A, illustrating intermediate stages in the formation of the dummy structures DS in the second portion 110B of the diaphragm 110.

Figure 3A:
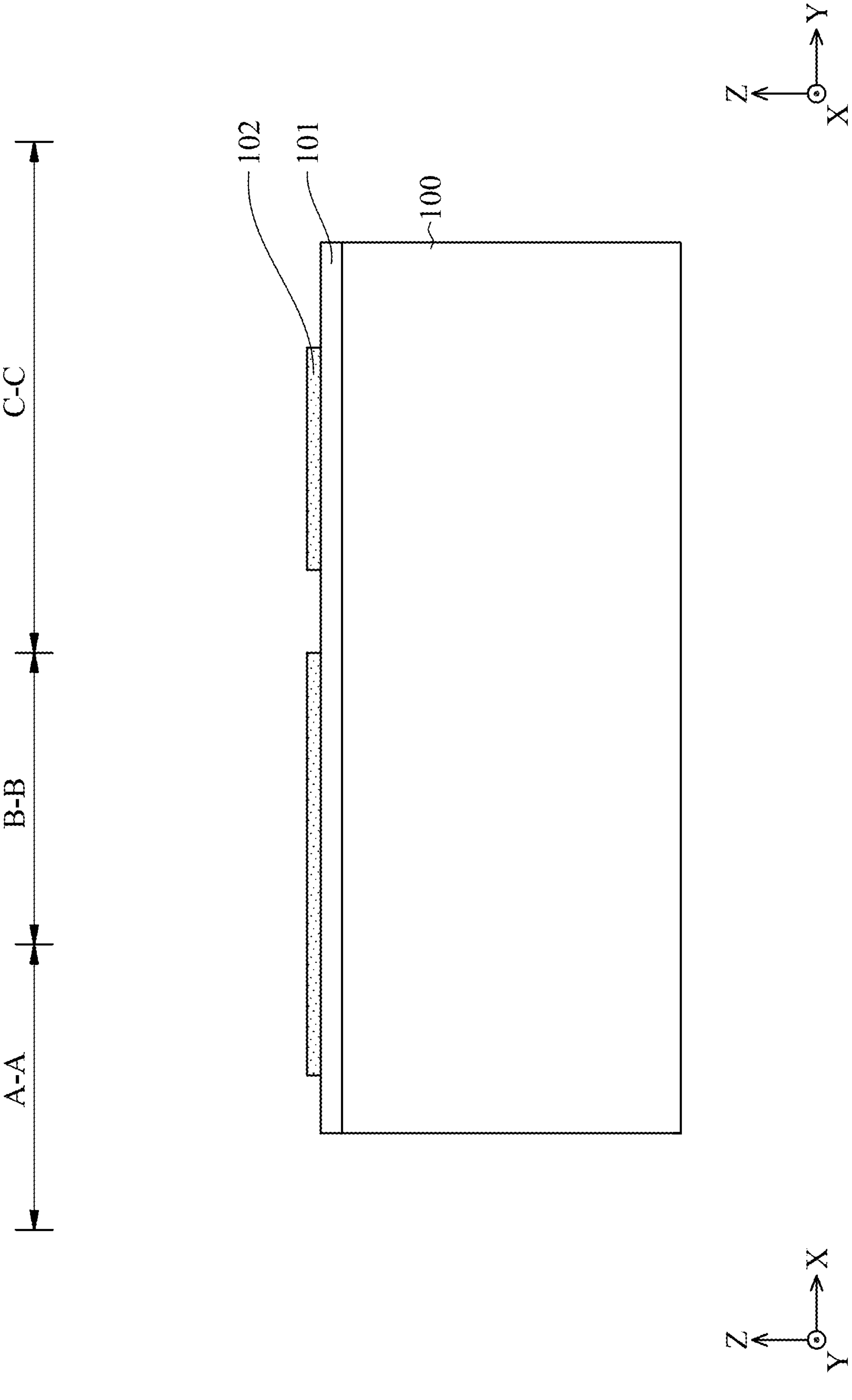
FIGS. 3A, 3A-1, 3B, 3B-1, 3C, 3C-1, 3D, 3D-1, 3E, 3E-1, 3F, and 3G illustrate cross-sectional views of intermediate stages in the formation of a package structure of a micro speaker in accordance with some embodiments.
Figures 1, 3A:
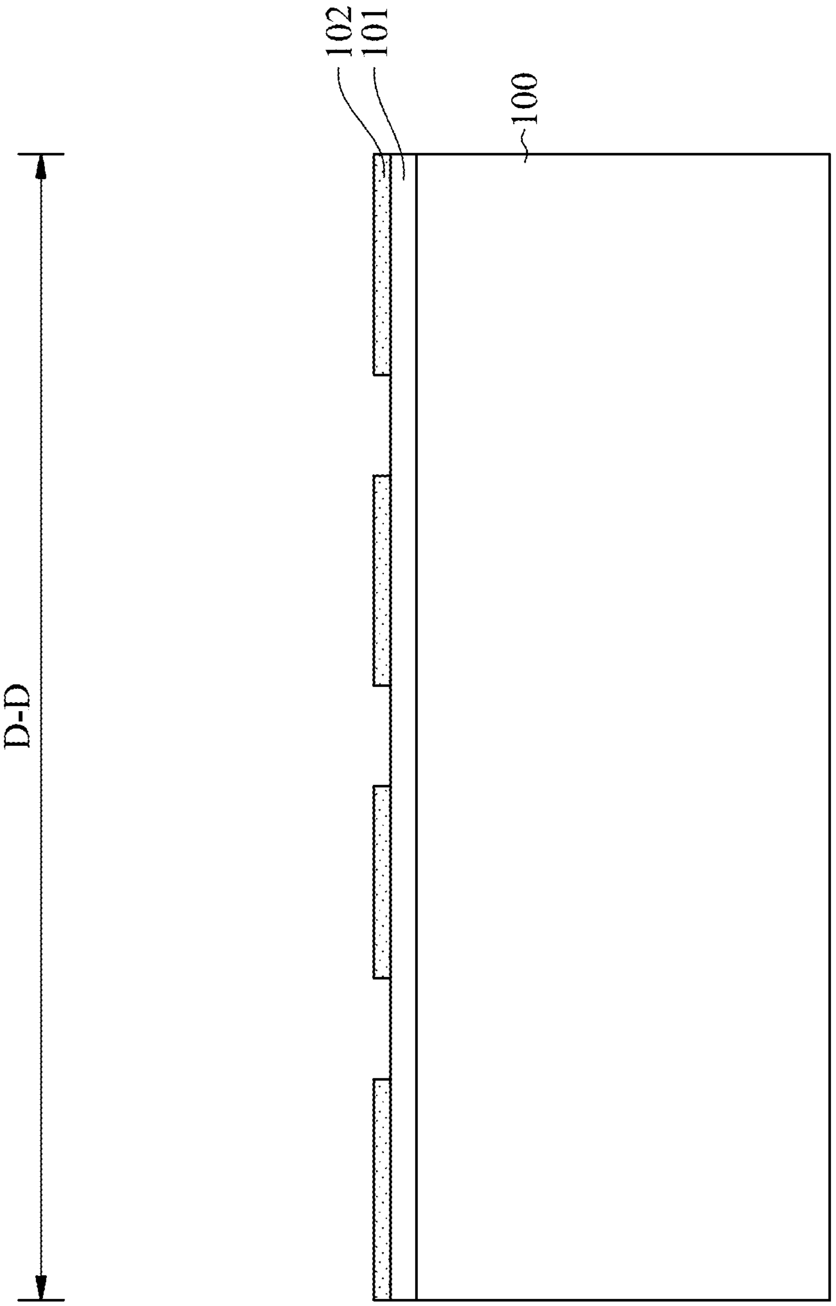

As shown in FIGS. 3A and 3A-1, a dielectric layer 101 is formed on the top surface of a substrate 100. In some embodiments, the substrate 100 may be part of a semiconductor wafer, and may be formed of silicon (Si). The substrate 100 may also include other semiconductor materials, such as germanium; a compound semiconductor including silicon carbide (SiC), gallium arsenic (GaAs), gallium phosphide (GaP), gallium nitride (GaN), indium phosphide (InP), and/or indium arsenide (InAs); an alloy semiconductor including SiGe, SiGeC, GaAsP, GaInAs, and/or InGaP; or combinations thereof. In some embodiments, the dielectric layer 101 is made of or includes silicon dioxide (SiO2) or other suitable insulating materials. The dielectric layer 101 may be formed on the substrate 100 through thermal oxidation, chemical vapor deposition (CVD), low pressure CVD (LPCVD), atmospheric pressure CVD (APCVD), plasma-enhanced chemical vapor deposition (PECVD), or a combination thereof.

Next, an etch stop metal layer 102 (hereinafter also referred to as an etch stop layer 102) is formed on the dielectric layer 101. In some embodiments, the etch stop metal layer 102 is made of or includes aluminum, copper, aluminum-copper alloy, aluminum-silicon alloy, aluminum-silicon-copper alloy, or other suitable metal materials that can protect the subsequently formed coil structure 120 from being etched during the subsequent etching process of the substrate 100 illustrated in FIGS. 3E and 3E-1. The etch stop metal layer 102 may be formed by electroplating or other deposition processes such as physical vapor deposition (PVD), sputtering or evaporation. The etch metal stop layer 102 is then patterned (not shown separately) such that the remainder of the patterned etch stop metal layer 102 is located directly below the subsequently formed coil structure 120 (see FIGS. 3B and 3C, for example) and overlaps the coil structure 120 in plan view (as shown in FIG. 2). The patterning process may include photolithography processes (for example, photoresist coating, soft baking, mask alignment, exposure, post-exposure baking, photoresist development, other suitable processes or a combination thereof), etching processes (for example, wet etching process, dry etching process, other suitable processes or a combination thereof), other suitable processes, or a combination thereof.

In some embodiments, the patterned etch stop metal layer 102 is a complete, continuous structure for the corresponding coil structure 120 above. That is, the patterned etch stop metal layer 102 has no openings in the gaps between adjacent coil portions (the terms "coil portions" used herein refer to the solid portions of the coil structure 120), as shown in FIG. 2. In some other embodiments (not shown), the patterned etch stop metal layer 102 is a discontinuous structure. More specifically, the etch stop metal layer 102, after being patterned, includes a plurality of discrete (solid) portions corresponding to adjacent coil portions of the first metal layer 121 (e.g., spiral structure 121A) of the coil structure 120, with an opening formed between adjacent coil portions of the first metal layer 121. In some embodiments, the thickness of etch stop metal layer 102 may be preferably more than about 100 μm for better protection, but the present disclosure is not limited thereto.

In some embodiments, a portion of the patterned etch stop metal layer 102 may also be located under the subsequently formed dummy structures DS, as shown in FIGS. 3A-1, 3B-1, 3C-1 and 3D-1, so that the formed dummy structures DS have the same or similar thickness as the formed coil structure 120.

Figure 3B:
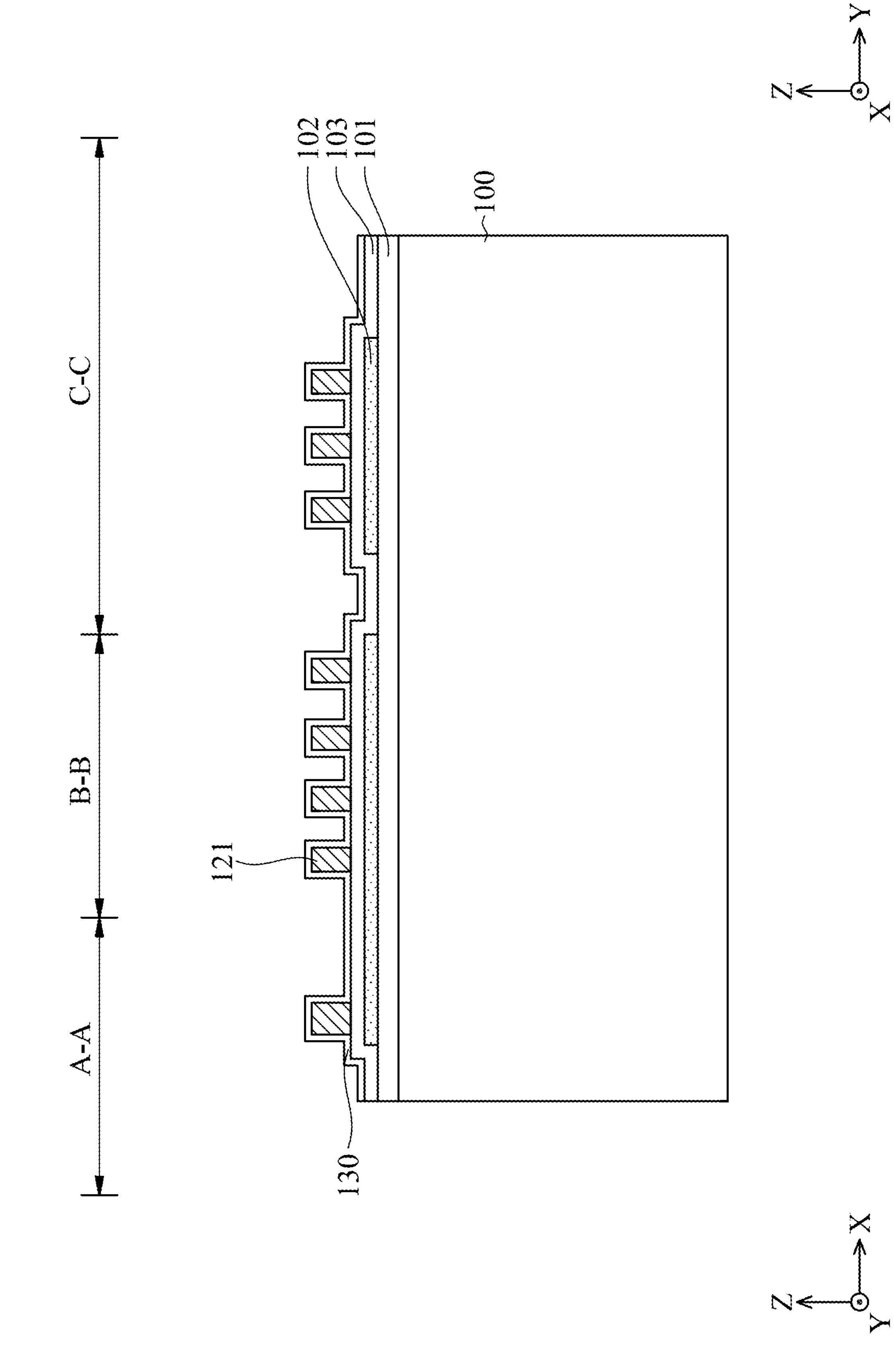
Figures 1, 3B:
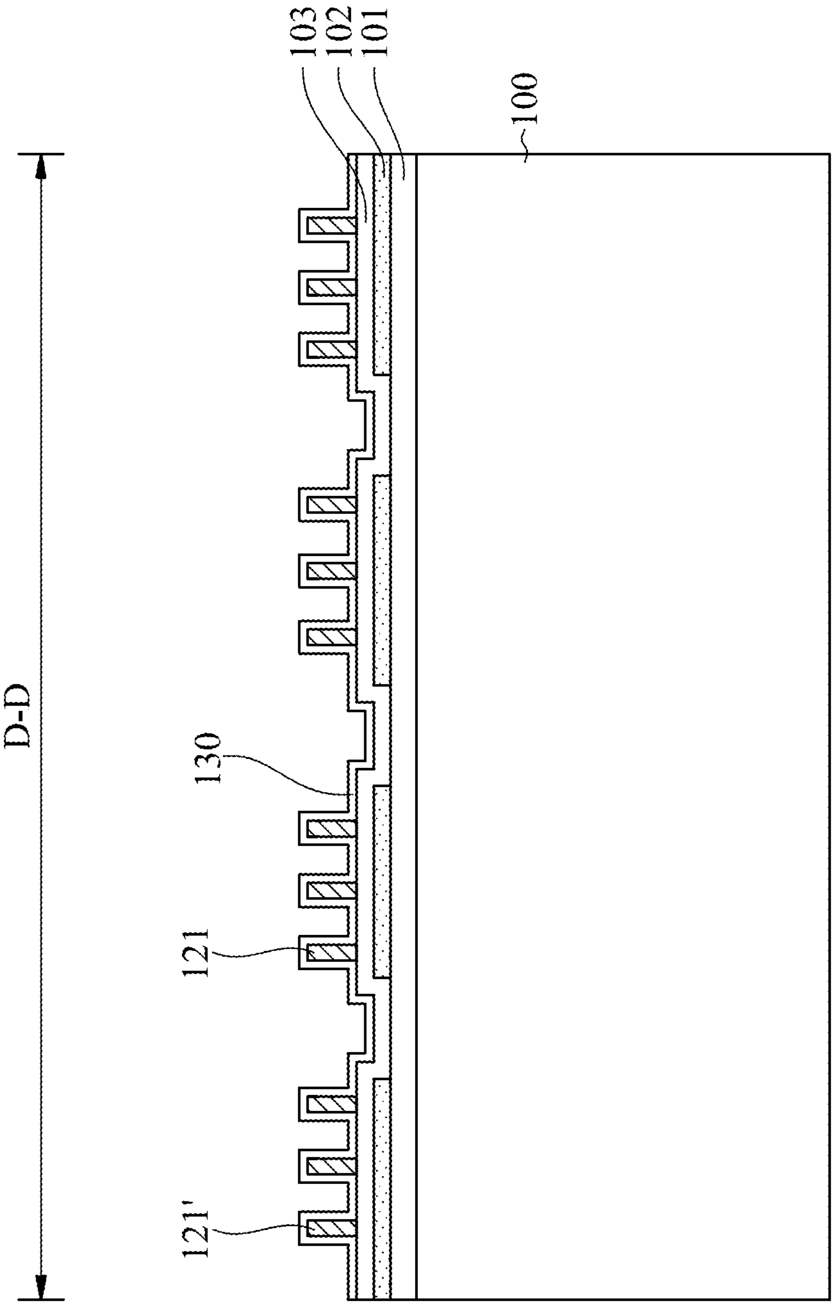

As shown in FIGS. 3B and 3B-1, a dielectric layer 103 is conformally formed on the etch stop metal layer 102 and the dielectric layer 101. The materials and formation method of the dielectric layer 103 may be the same as or similar to those of the dielectric layer 101, and are not repeated here.

After the dielectric layer 103 is formed, a first metal layer 121 of the coil structure 120 is formed on the dielectric layer 103 in the central region of the substrate 100, as shown in FIG. 3B. In some embodiments, the first metal layer 121 includes aluminum silicon alloy, aluminum, copper, a combination thereof, or other suitable metal materials. The first metal layer 121 may be formed through electroplating or other deposition processes such as physical vapor deposition (PVD), sputtering or evaporation. The first metal layer 121 is then patterned (not shown separately) to form the spiral structure 121A and the wavy structure 121B as shown in FIG. 1A. The patterning process may include photolithography processes (for example, photoresist coating, soft baking, mask alignment, exposure, post-exposure baking, photoresist development, other suitable processes or a combination thereof), etching processes (for example, wet etching process, dry etching process, other suitable processes or a combination thereof), other suitable processes, or a combination thereof. In some embodiments, the width of the first metal layer 121 may be in a range between about 1 μm and about 500 μm, and the thickness of the first metal layer 121 may be in a range between about 0.1 μm and about 20 μm.

Additionally, a first metal layer 121' of the dummy structures DS is also formed and patterned on the dielectric layer 103, as shown in FIG. 3B-1. The patterned first metal layer 121' may include a plurality of discrete pillar structures located in the peripheral region of the substrate 100. In some embodiments, the patterned first metal layer 121' may be formed by the same processes and the same materials as the patterned first metal layer 121 of the coil structure 120 described above. That is, the formation of the first metal layer 121' of the dummy structures DS and the formation of the first metal layer 121 of the coil structure 120 may be performed at the same time. In some other embodiments, the formation of the first metal layer 121' of the dummy structures DS may be performed before or after the formation of the first metal layer 121 of the coil structure 120. It should be noted that there is no physical or electrical connection between the first metal layer 121' of the dummy structures DS and the first metal layer 121 of the coil structure 120. The width and thickness of the first metal layer 121' of the dummy structures DS may the same or similar to those of the first metal layer 121 of the coil structure 120.

Still referring to FIGS. 3B and 3B-1, another dielectric layer 130 is conformally formed on the first metal layer 121, the first metal layer 121', and the dielectric layer 103. In some embodiments, the dielectric layer 130 is made of or includes carbon-doped oxides or other suitable insulating materials, and may be formed through furnace process or chemical vapor deposition (CVD) process.

Figure 3C:
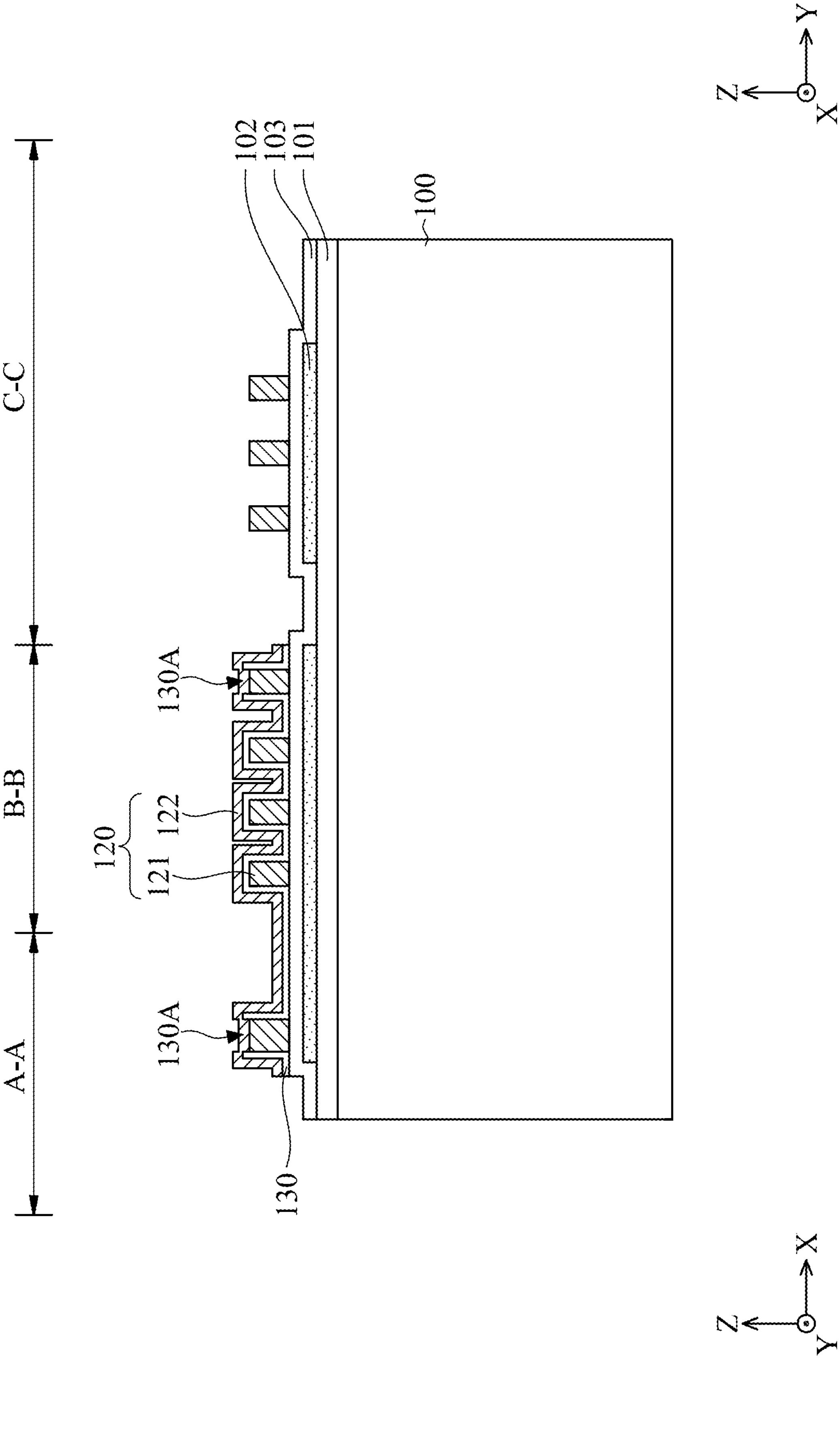
Figures 1, 3C:
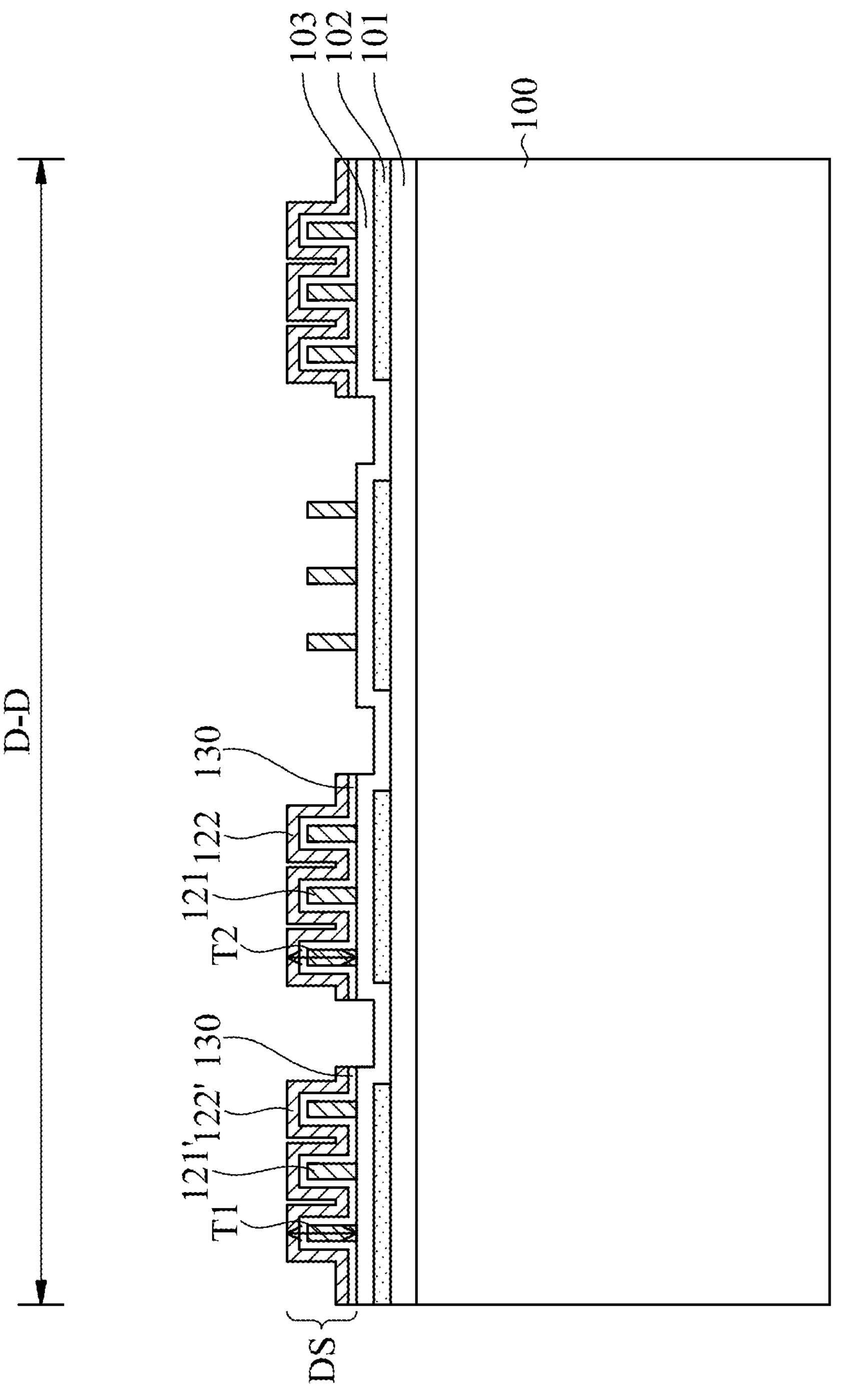

As shown in FIG. 3C, the dielectric layer 130 is then patterned (e.g., through a photolithography process and an etching process, not shown separately) to form through holes 130A in the dielectric layer 130 to expose a portion of the first metal layer 121 of the coil structure 120. Next, a second metal layer 122 of the coil structure 120 is formed on the dielectric layer 130 and on the first metal layer 121 through electroplating or other deposition processes such as physical vapor deposition (PVD), sputtering or evaporation. In some embodiments, the second metal layer 121 includes aluminum silicon alloy, aluminum, copper, a combination thereof, or other suitable metal materials. The second metal layer 122 is then patterned (e.g., through a photolithography process and an etching process, not shown separately), leaving portions located on the dielectric layer 130, on the first metal layer 121 and in the through holes 130A.

It should be noted that the patterned dielectric layer 130 only leaves a portion required to electrically insulate the first metal layer 121 and the second metal layer 122. By removing undesired portions of the dielectric layer 130, the diaphragm 110 can be more flexible, thereby improving the performance of the micro speaker 10. In some embodiments, the width of the second metal layer 122 may be in a range between about 1 μm and about 500 μm, and the thickness of the second metal layer 122 may be in a range between about 0.1 μm and about 20 μm.

Additionally, a second metal layer 122' of the dummy structures DS is also formed and patterned on the dielectric layer 130 remaining on the first metal layer 121' of the dummy structures DS, as shown in FIG. 3C-1. The patterned second metal layer 122' may include a plurality of higher portions located above the discrete pillar structures of the first metal layer 121' and a plurality of lower portions filled in gaps between the pillar structures. Unlike the coil structure 120, the second metal layer 122' of the dummy structures DS is not connected to the first metal layer 121' of the dummy structures DS. In some embodiments, the patterned second metal layer 122' may be formed by the same processes and the same materials as the second metal layer 122 of the coil structure 120 described above. That is, the formation of the second metal layer 122' of the dummy structures DS and the formation of the second metal layer 122 of the coil structure 120 are performed at the same time. In some other embodiments, the formation of the second metal layer 122' of the dummy structures DS may be performed before or after the formation of the second metal layer 122 of the coil structure 120. The thickness of the second metal layer 122' of the dummy structures DS may the same or similar to that of the second metal layer 122 of the coil structure 120.

In this way, the dummy structures DS (e.g., the protruding parts composed of the first metal layer 121', the second metal layer 122', and the intervening dielectric layer 130) can have the same or similar multi-layered structure as the multi-layered coil structure 120, and the thickness T1 of the dummy structures DS is substantially equal to the thickness T2 of the coil structure 120, as shown in FIG. 3C-1. In some embodiments, the dummy structures DS may be uniformly disposed in the peripheral region of the substrate 100 around the coil structure 120. This helps to improve the flatness of the top surface 110S of the subsequent formed diaphragm 110 (see FIG. 3D-1). Although the dummy structure DS is described as having the same structure as the coil structure 120 in the above embodiments, the present disclosure is not limited thereto. For example, in some other embodiments (not shown separately), the dummy structure DS may also be a single-layer structure composed of a semiconductor material (e.g., silicon), a dielectric material (e.g., an oxide), a metal material (e.g., aluminum, copper or the like), or a combination thereof, which is formed using any applicable process, as long as the formed dummy structure DS have the same or similar thickness as the coil structure 120.

Although not shown, a protection layer (which may also be referred to a passivation layer) may also be conformally formed on the coil structure 120 (and the dummy structures DS) for protection. In some embodiments, the protection layer has a multi-layered structure and includes an oxide layer (e.g., silicon oxide) and a nitride layer (e.g., silicon nitride) over the oxide layer. In other embodiments, the protection layer has a single layer structure, e.g., having a single nitride layer. The protection layer may be formed using, for example, CVD, PVD, another applicable process, or a combination thereof.

Figure 3D:
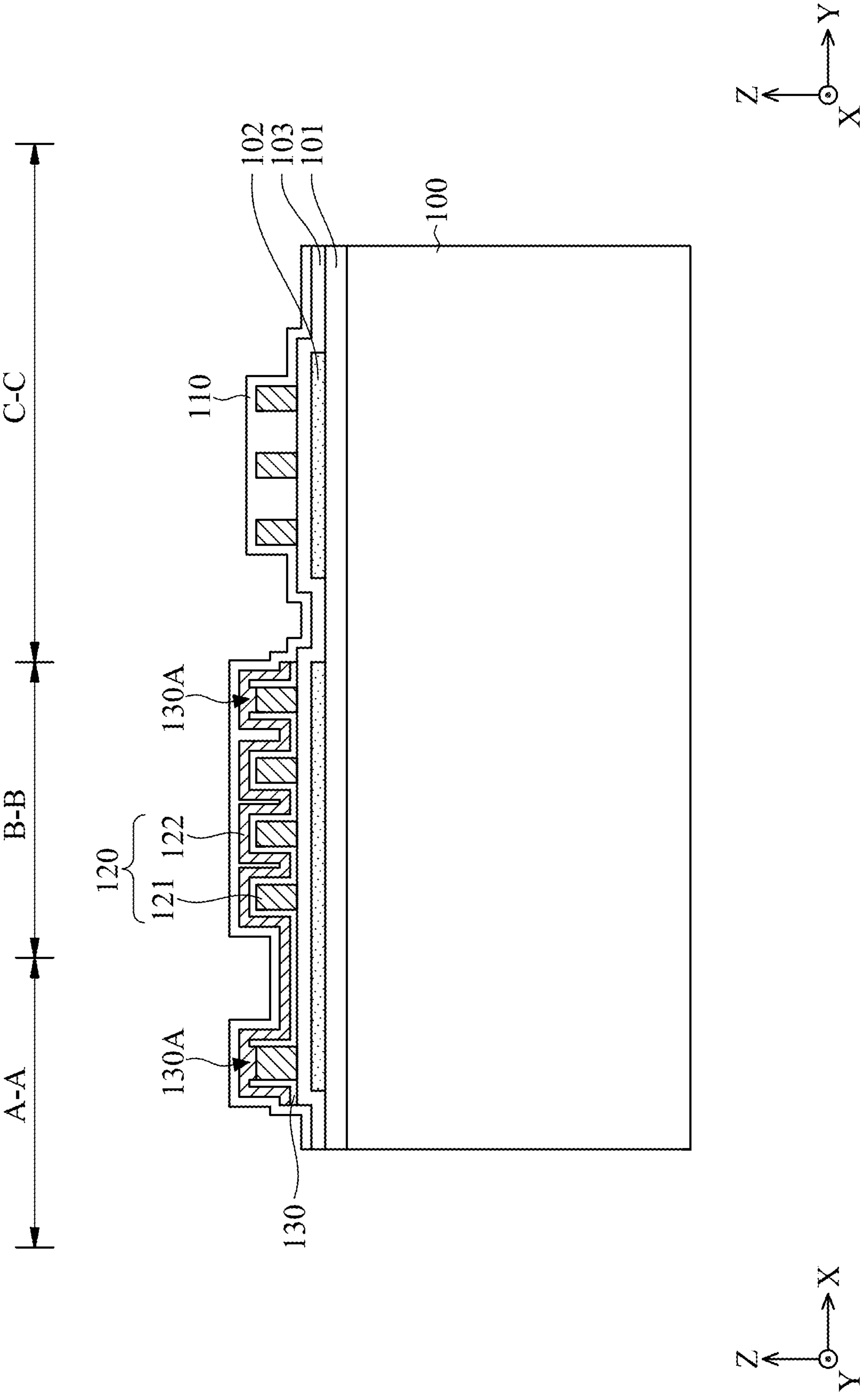
Figures 1, 3D:
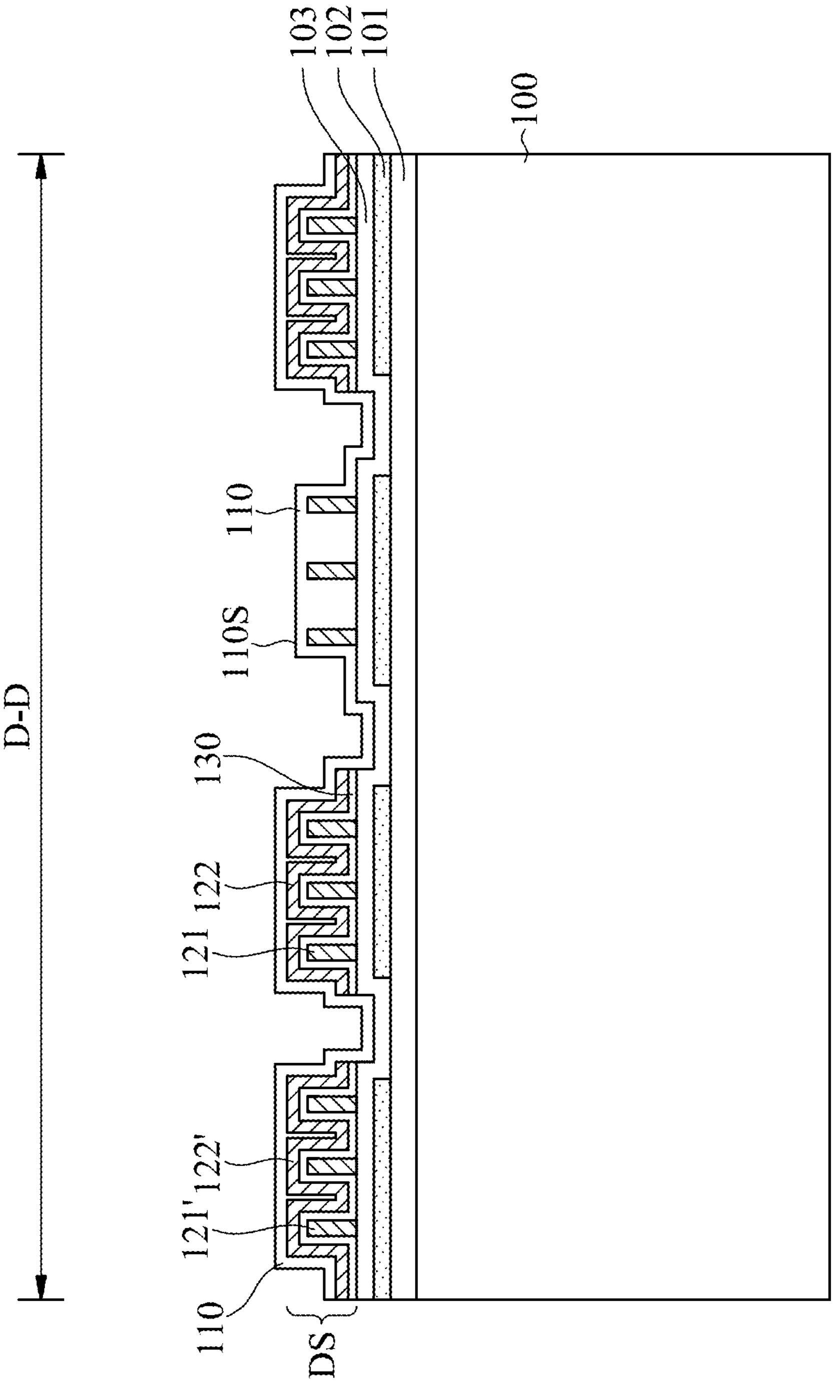

As shown in FIGS. 3D and 3D-1, a diaphragm 110 is conformally formed on the multi-layered coil structure 120, on the multi-layered dummy structures DS, on the dielectric layer 130, and on the dielectric layer 103 (and on the protection layer, if any) such that the coil structure 120, the dummy structures DS, the dielectric layer 130 and the dielectric layer 103 are embedded in the diaphragm 110. The diaphragm 110 may be formed through spin coating, slot-die coating, blade coating, wire bar coating, gravure coating, spray coating, chemical vapor deposition (CVD), another applicable process, or a combination thereof. In some embodiments, the thickness of the diaphragm 110 is in a range between about 0.1 μm and about 20 μm. As described above, the coated or formed diaphragm 110 may have improved flatness at the top surface 110S (i.e., the difference in height of the central region and the peripheral region of the diaphragm 110 is reduced) due to the dummy structures DS compared to the case where the dummy structure DS is not provided.

In some embodiments, the diaphragm 110 is made of or includes polydimethylsiloxane (PDMS), phenolic epoxy resin (such as SU-8), polyimide (PI), or a combination thereof. In an example, the diaphragm 110 is formed of PDMS, and the Young's modulus of the diaphragm 110 is in a range between about 1 MPa and about 100 GPa. Compared with a diaphragm formed of polyimide, the diaphragm 110 formed of PDMS has a smaller Young's modulus and a softer film structure, which makes the diaphragm 110 have a larger displacement, thereby generating a larger sound amplitude. In some embodiments, the dummy structures DS are electrically isolated from the coil structure 120 through the diaphragm 110.

Figure 3E:
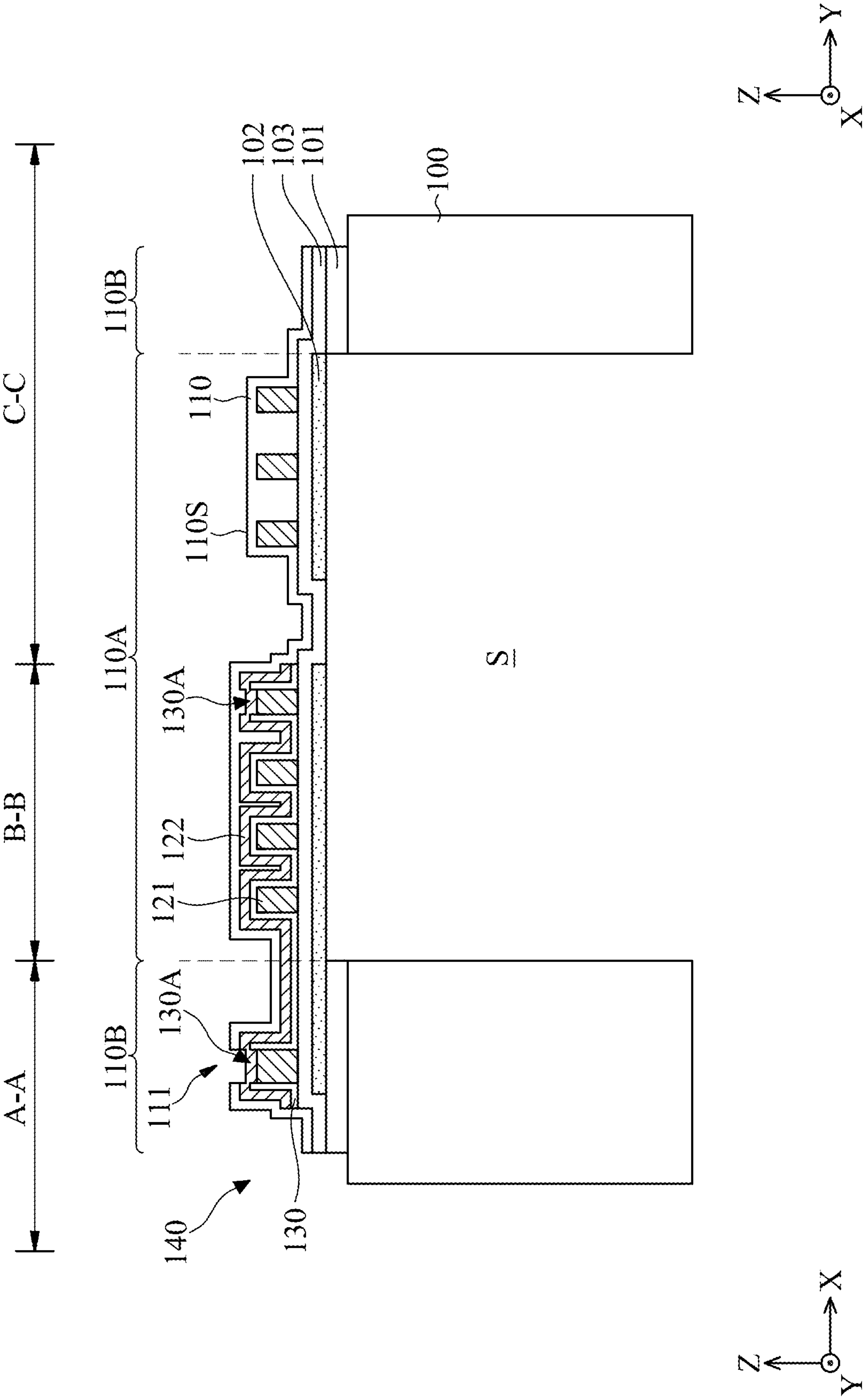
Figures 1, 3E:
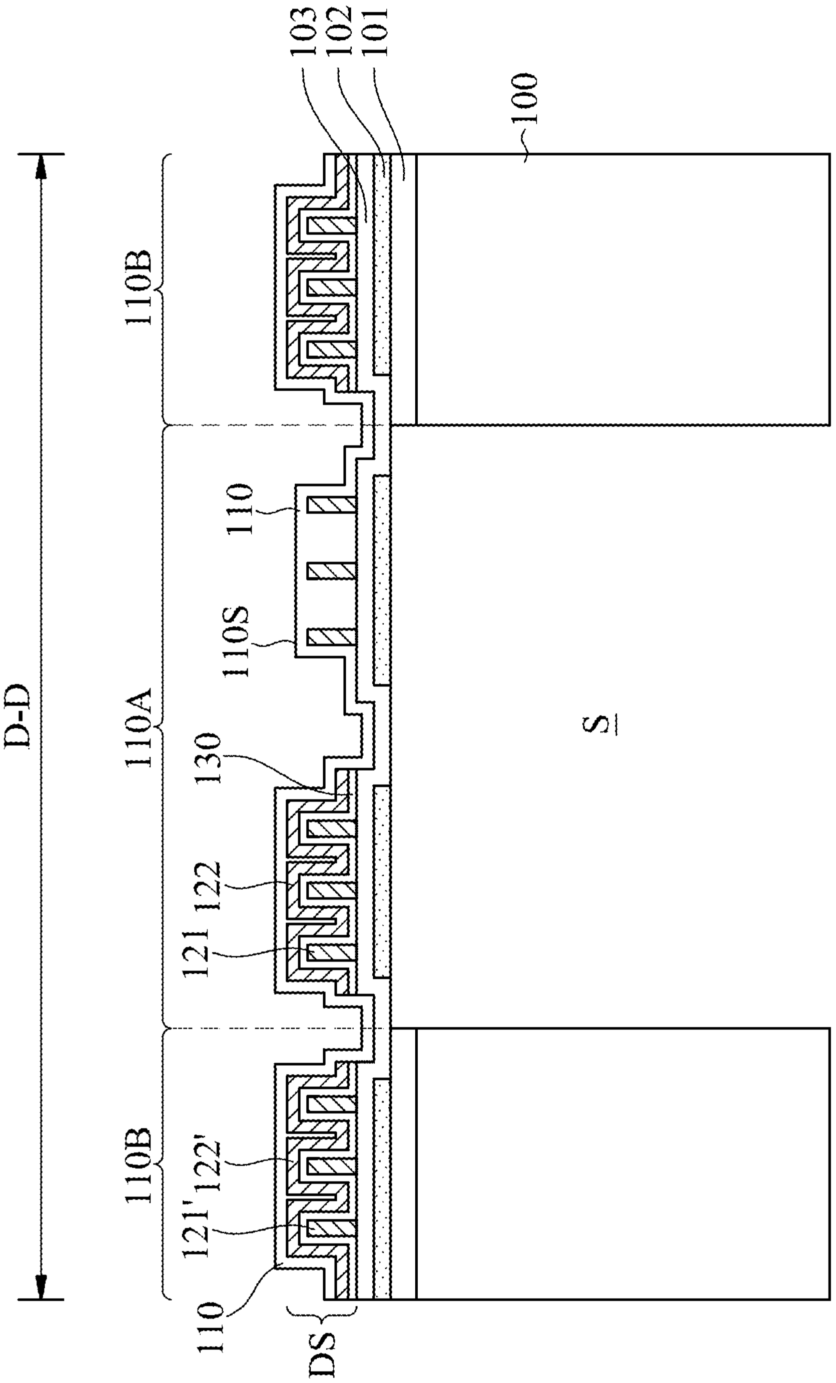

As shown in FIG. 3E, the diaphragm 110 is then patterned to form openings 111 (only one opening 111 is illustrated) in the diaphragm 110 and a cutting groove 140 surrounding the diaphragm 110. In some embodiments where the diaphragm 110 is made of a photosensitive material such as a photosensitive polymer material, the openings 111 and cutting groove 140 are formed by using photolithography techniques. In other embodiments where the diaphragm 110 is made of a non-photosensitive material, the openings 111 and cutting groove 140 are formed by using drilling, cutting, and/or other suitable patterning techniques. The openings 111 are configured to expose the second metal layer 122. The first metal layer 121 is electrically connected to the second metal layer 122 in one of the openings 111, as mentioned above. In other words, when viewed in a vertical direction (Z-axis), one of the openings 111 of the diaphragm 110 and one of the through holes 130A may overlap. The cutting groove 140 is configured to define areas on the wafer for each package structure (of the micro speaker 10). In this way, the cutting groove 140 may facilitate cutting (for example, laser cutting) to separate the package structure.

As shown in FIGS. 3E and 3E-1, a deep reactive-ion etching process or an etching process which applies an etchant (such as ammonium hydroxide (NH4OH), hydrofluoric acid (HF), deionized water, tetramethylammonium hydroxide (TMAH), potassium hydroxide (KOH)) is also performed on the bottom surface of the substrate 100 to form a hollow chamber S in the substrate 100. It should be understood that the etching process is carried out with the top surface 110S of the diaphragm 110 facing downward (not shown separately), so the diaphragm 110 with improved flatness (due to the dummy structures DS) helps to disperse the stress (e.g., pressure) on the top surface 110S to avoid large stress concentrations in localized area corresponding to the coil structure 120. Therefore, the possibility of damage to the coil structure 120 can be reduced, and the reliability of the package structure can be improved.

In some embodiments, the dielectric layers 101 and 103 and the etch stop metal layer 102 can be used as etch stop layers to protect the diaphragm 110 and the multi-layered coil structure 120 from being etched. In particular, the etch stop layer 102 made of a metal material protects the coil structure 120 better than the example with only dielectric layer 101 and 103 (i.e., no etch stop metal layer). Therefore, process yield and device/product reliability can also be improved.

Still referring to FIGS. 3E and 3E-1, the diaphragm 110 is suspended over the hollow chamber S after the etching process. More specifically, the first portion 110A of the diaphragm 110 embedded with the coil structure 120 is suspended over the hollow chamber S, while the second portion 110B of the diaphragm 110 embedded with the dummy structures DS is still fixed on the substrate 100. Since the dummy structures DS are arranged in the fixed part of the diaphragm 110, they will not affect the performance (e.g., oscillations) of the diaphragm 110.

Figure 4A:
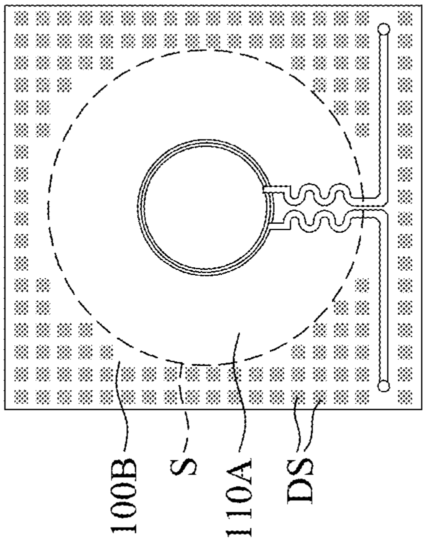
FIGS. 4A to 4H illustrate various configurations and/or shapes of dummy structure(s) in the second portion of the diaphragm in accordance with some embodiments.
Figure 4B:
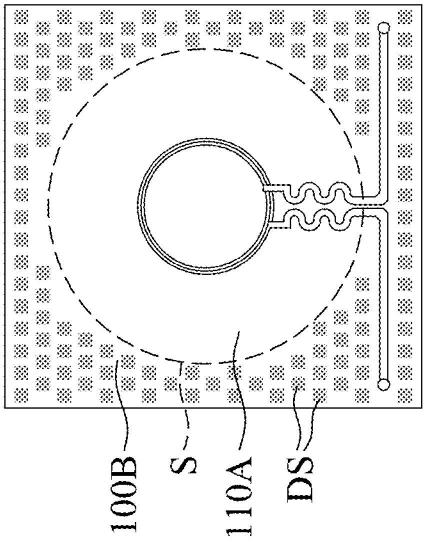
Figure 4C:
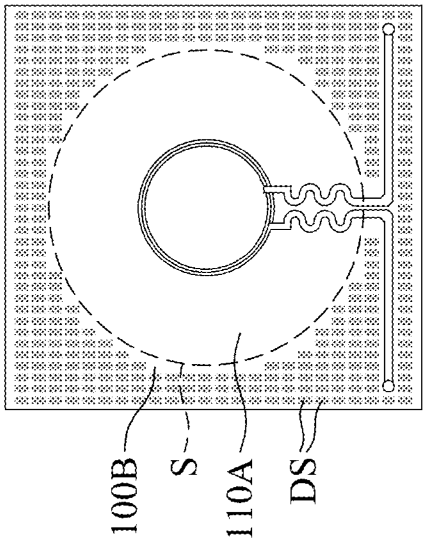
Figure 4D:
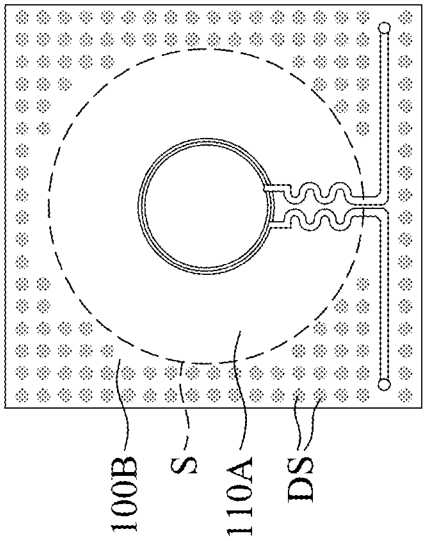
Figure 4E:
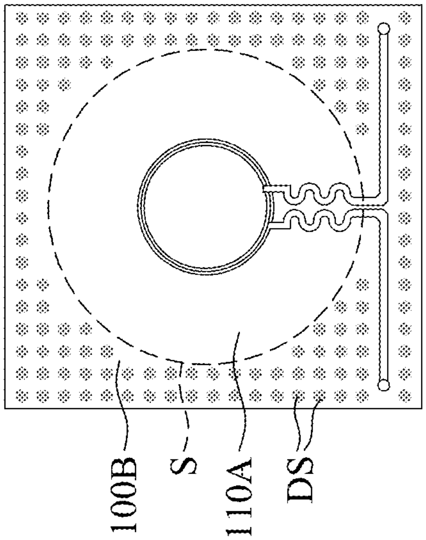
Figure 4F:
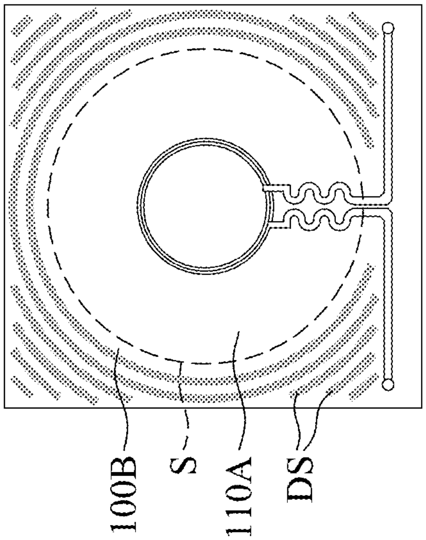
Figure 4G:
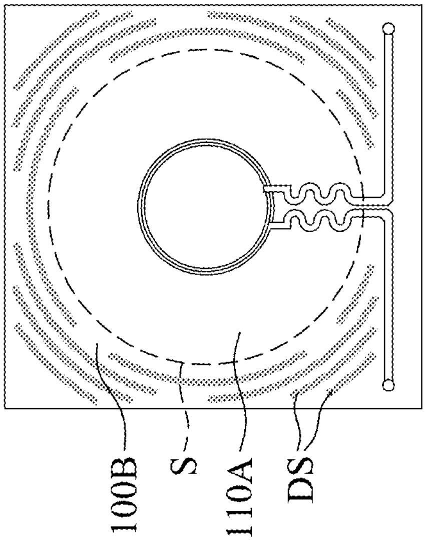
Figure 4H:
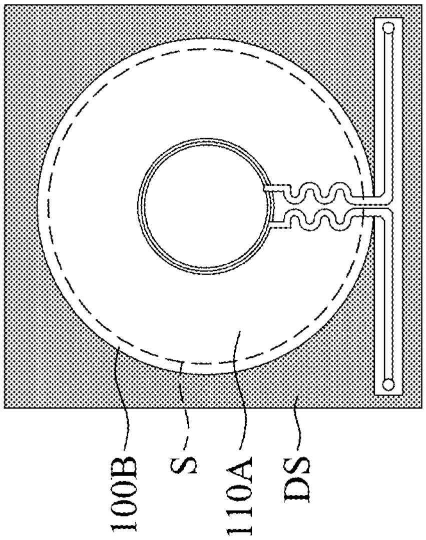

FIGS. 4A to 4H are plan views illustrating various configurations and/or shapes of dummy structure(s) DS in the second portion 110B of the diaphragm 110 in accordance with some embodiments. In FIG. 4A, the dummy structures DS are evenly distributed in the second portion 110B of the diaphragm 110 (e.g., formed in a matrix pattern), and each dummy structure DS has a square shape. The pitch (i.e., the structure-to-structure distance) between adjacent dummy structures DS may range from 10 μm to 50 μm, and/or the distance between the hollow chamber S and the closest dummy structure DS may be about 50 μm, although other values and ranges may also be used. In FIG. 4B, the dummy structures DS are arranged in rows along a first direction (e.g., the X-axis direction shown), while the dummy structures DS are staggered along a second direction perpendicular to the first direction (e.g., the Y-axis direction shown). In FIG. 4C, each dummy structure DS has a rectangular shape. In FIG. 4D, each dummy structure DS has a circular shape. In FIG. 4E, each dummy structure DS has a hexagonal shape. In FIGS. 4F and 4G, the dummy structures DS are arranged in a concentric circles, and each dummy structure DS has a curved shape. In FIG. 4G, there are multiple curves within the same concentric circle. In FIG. 4H, there is only a single and continuous dummy structure DS arranged in the second portion 110B of the diaphragm 110, and the shape of the dummy structure DS corresponds to the shape of the second portion 110B of the diaphragm 110. In different embodiments, other suitable configurations and/or shapes of dummy structure(s) DS may also be used.

Figure 3F:
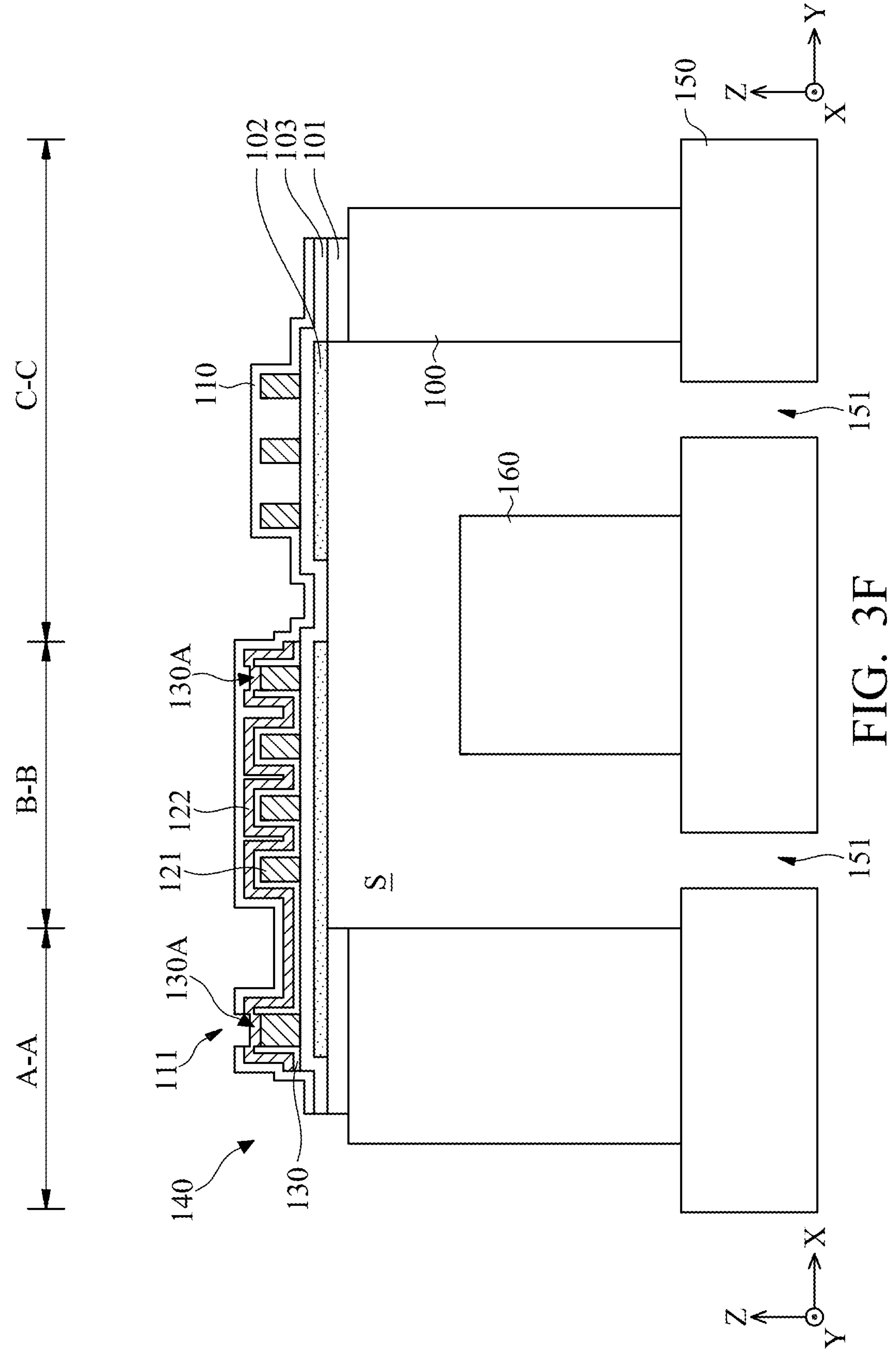

Referring next to FIG. 3F. After the hollow chamber S is formed in the substrate 100, a carrier board 150 (such as a PCB) is disposed on or attached to the bottom surface of the substrate 100. Therefore, the substrate 100 is located between the carrier board 150 and the diaphragm 110. The carrier board 150 has one or more vent holes 151, which allow the hollow chamber S to communicate with the external environment.

A first permanent magnetic element 160 is disposed on the carrier board 150 and in the hollow chamber S. The first permanent magnetic element 160 is used to cooperate with the multi-layered coil structure 120 (i.e., the magnetic field generated by the first permanent magnetic element 160 interacts with a current passing through the multi-layered coil structure 120) to generate a force (e.g., Z-axis force) in the normal direction (i.e., the vertical direction, which is perpendicular to its top surface) of the substrate 100, and the diaphragm 110 can vibrate/oscillate relative to the substrate 100 due to the force to generate sound. In some embodiments, the first permanent magnetic element 160 is a neodymium iron boron magnet. In other embodiments, other permanent magnet materials may also be used.

Figure 3G:
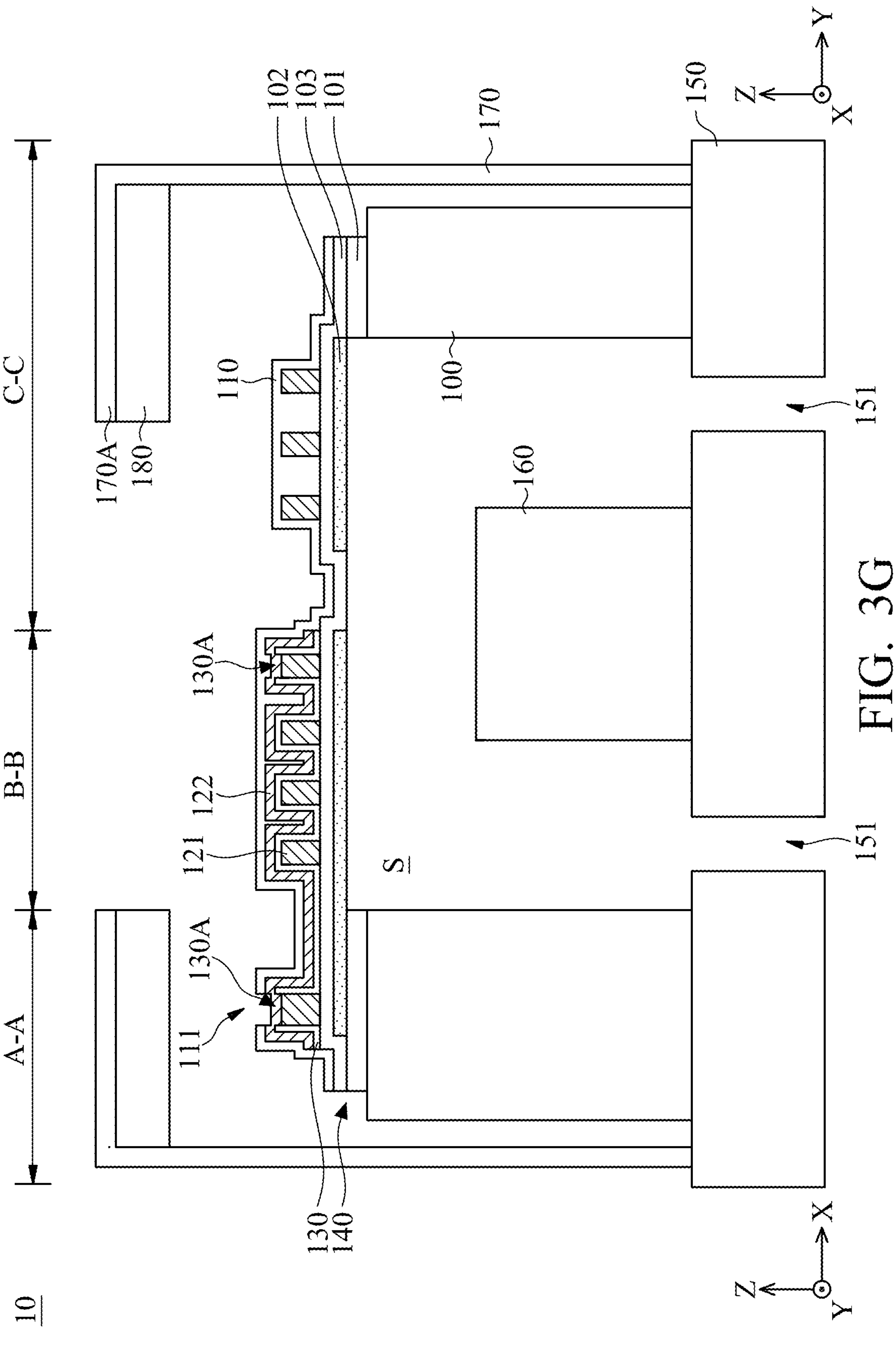

As shown in FIG. 3G, a package lid 170 is disposed on or attached to the carrier board 150. The package lid 170 is designed to wrap around and protect the substrate 100 and the diaphragm 110. The package lid 170 may have a lid opening 170A to allow acoustic energy due to vibration of the diaphragm 110 to travel out of the package structure of the micro speaker 10. In some embodiments, the package lid 170 is made of a metal material having a magnetic permeability lower than about $1.25\times10^{-4}$ H/mm, such as gold (Au), copper (Cu), aluminum (Al), or a combination thereof, which helps maintain or confine the magnetic field in the package structure of the micro speaker 10.

Still referring to FIG. 3G, a second permanent magnetic element 180 is disposed above the diaphragm 110. In the example of FIG. 3G, the second permanent magnetic element 180 may have a ring structure conforming to the shape of the lid opening 170A of package lid 170 (for example, the lid opening 170A is circular and the second permanent magnetic element 180 is circular ring-shaped, but the present disclosure is not limited thereto), and may be disposed below the lid opening 170A. In some embodiments, the second permanent magnetic element 180 is a neodymium iron boron magnet. In other embodiments, other permanent magnet materials may also be used.

The second permanent magnetic element 180 and the first permanent magnetic element 160 can attract each other to increase the deflection of the planar magnetic field. Accordingly, the force generated by the current passing through the multi-layered coil structure 120 and the planar magnetic field in the normal direction of the substrate 100 increases, so that the diaphragm 110 has a better frequency response, thereby improving the performance of the micro speaker 10.

In some embodiments, the distance between the first permanent magnetic element 160 and the second permanent magnetic element 180 may be in a range between about 200 μm and about 1000 μm. If the distance is greater than 1000 μm, there may not be sufficient attraction between the first permanent magnetic element 160 and the second permanent magnetic element 180 to increase the deflection of the planar magnetic field, resulting in a smaller frequency response of the micro speaker. Therefore, the performance of the micro speaker is degraded. If the distance is less than 200 μm, when the diaphragm 110 deforms up and down relative to the substrate 100, it may repeatedly contact and strike the first permanent magnetic element 160 and/or the second permanent magnetic element 180, which causes damage to the micro speaker structure. Therefore, the reliability of the micro speaker is reduced.

Figure 5:
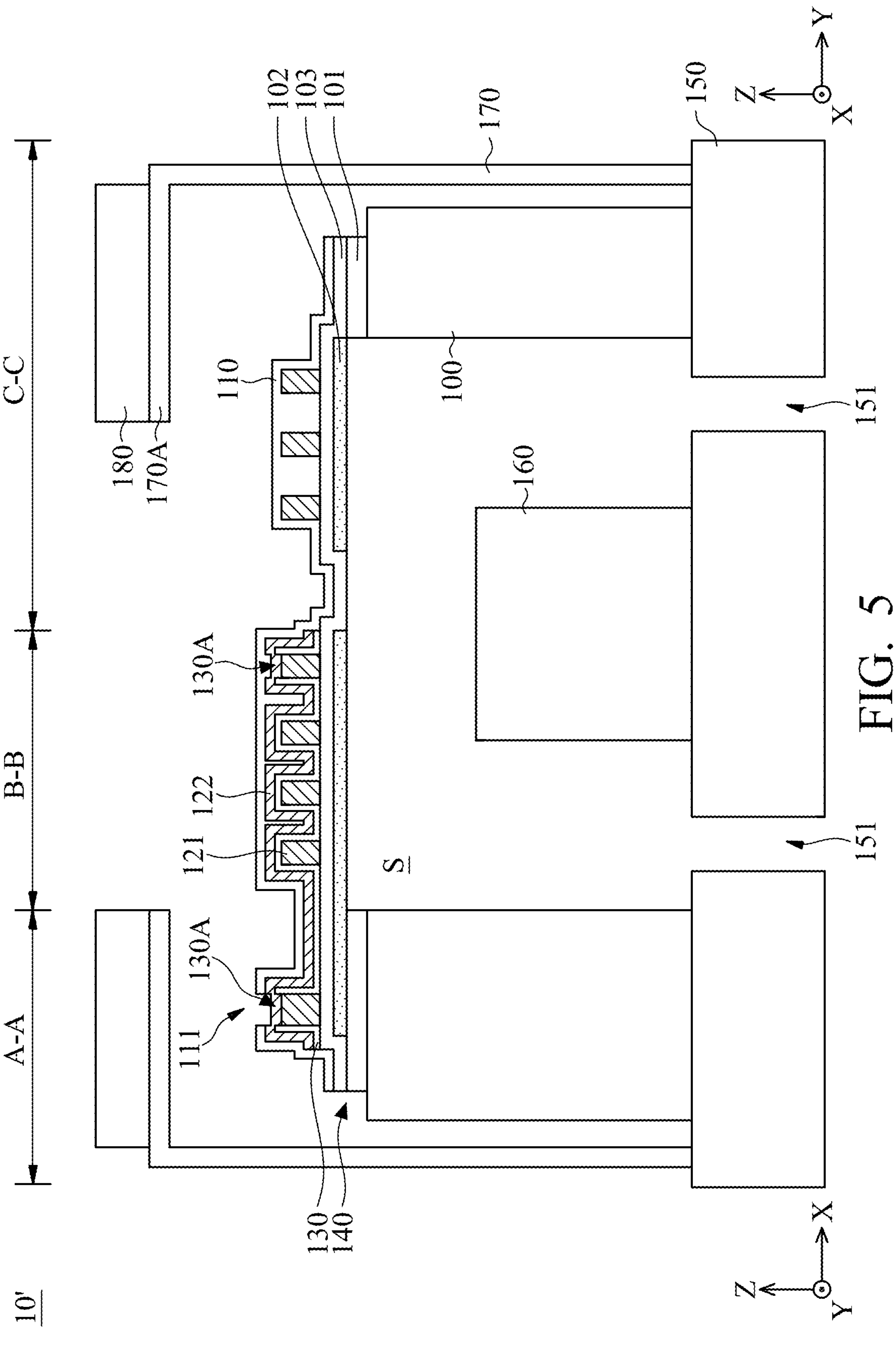
FIG. 5 illustrates a cross-sectional view of a package structure of a micro speaker in accordance with some embodiments.

In addition, the position of the second permanent magnetic element 180 is not limited to the embodiments shown in FIG. 3G. In some alternative embodiments, as shown in FIG. 5, the second permanent magnetic element 180 of a micro speaker 10' may also be disposed above the lid opening 170A of package lid 170. In other embodiments, the second permanent magnetic element 180 may also be omitted.

Figure 6:
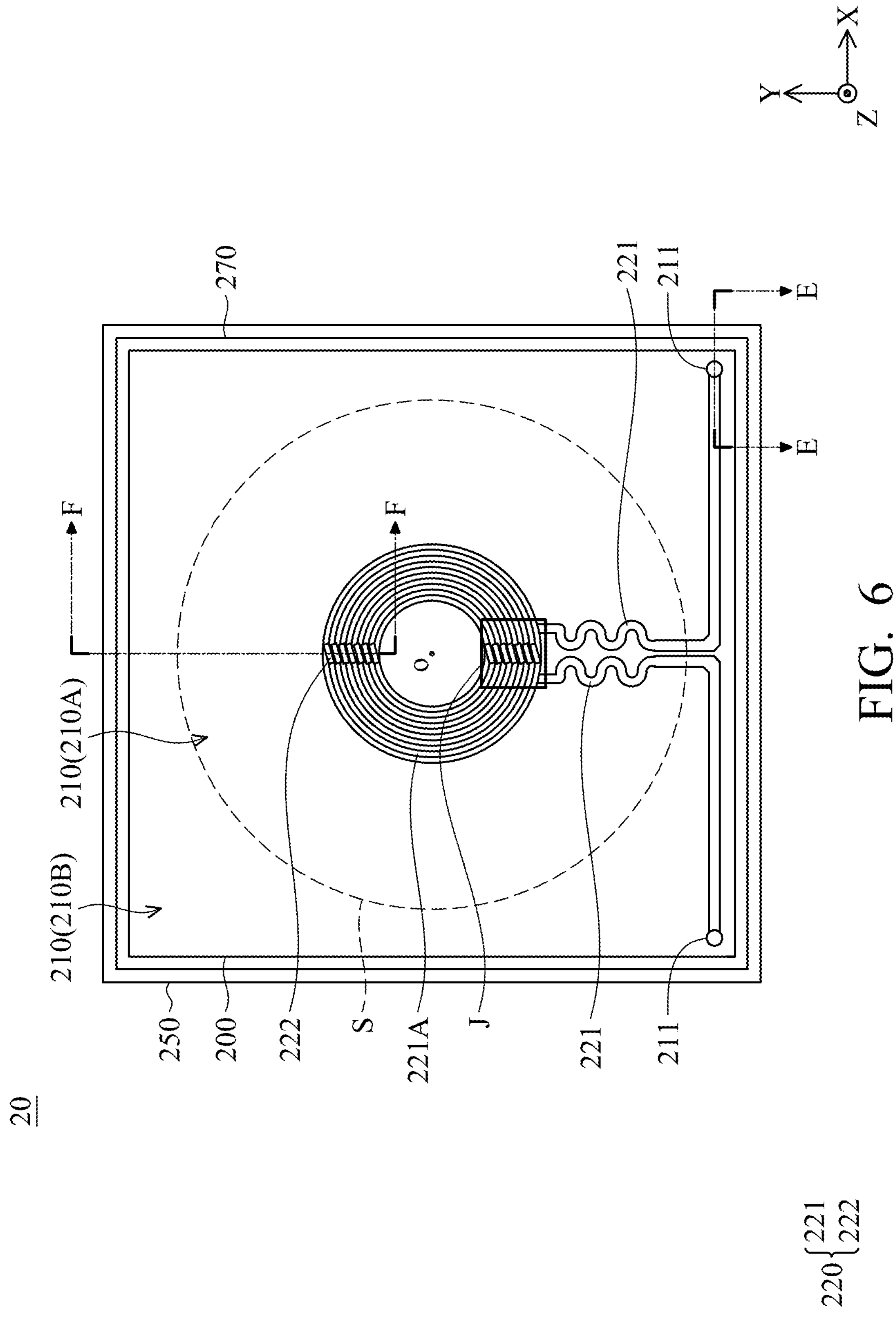
FIG. 6 illustrates a top view of a package structure of a micro speaker in accordance with some embodiments.

FIG. 6 illustrates a top view of a package structure of a micro speaker 20 in accordance with some other embodiments. The micro speaker 20 may include the same or similar components as the micro speaker 10 shown in FIG. 1A, and those components that are the same or similar will be labeled with similar numerals, the details thereof are not repeated here. For example, the package structure of the micro speaker 20 may mainly include a substrate 200, a diaphragm 210, a multi-layered coil structure 220 (hereinafter also referred to as a coil structure 220), a carrier board 250, and a package lid 270. It should be noted that the diaphragm 210 and the package lid 270 are only represented by rectangles in FIG. 6 in order to show internal structures of the package structure.

Similarly, a hollow chamber S (shown in dashed lines) is formed in the substrate 200. The diaphragm 210 is disposed above the substrate 200, and it can elastically vibrate up and down in the normal direction of the substrate 200. The diaphragm 210 includes a centrally located first portion 210A and a second portion 210B surrounding the first portion 210A. The second portion 210B is a fixed part of the diaphragm 210 attached to the substrate 200, whereas the first portion 210A is a movable part of the diaphragm 210 suspended above the hollow chamber S. In a plan view (as shown in FIG. 6), the first portion 210A of the diaphragm 210 overlaps the hollow chamber S, while the second portion 210B of the diaphragm 210 does not overlap the hollow chamber S (i.e., the second portion 210B is located outside the area of the hollow chamber S).

Figure 7:
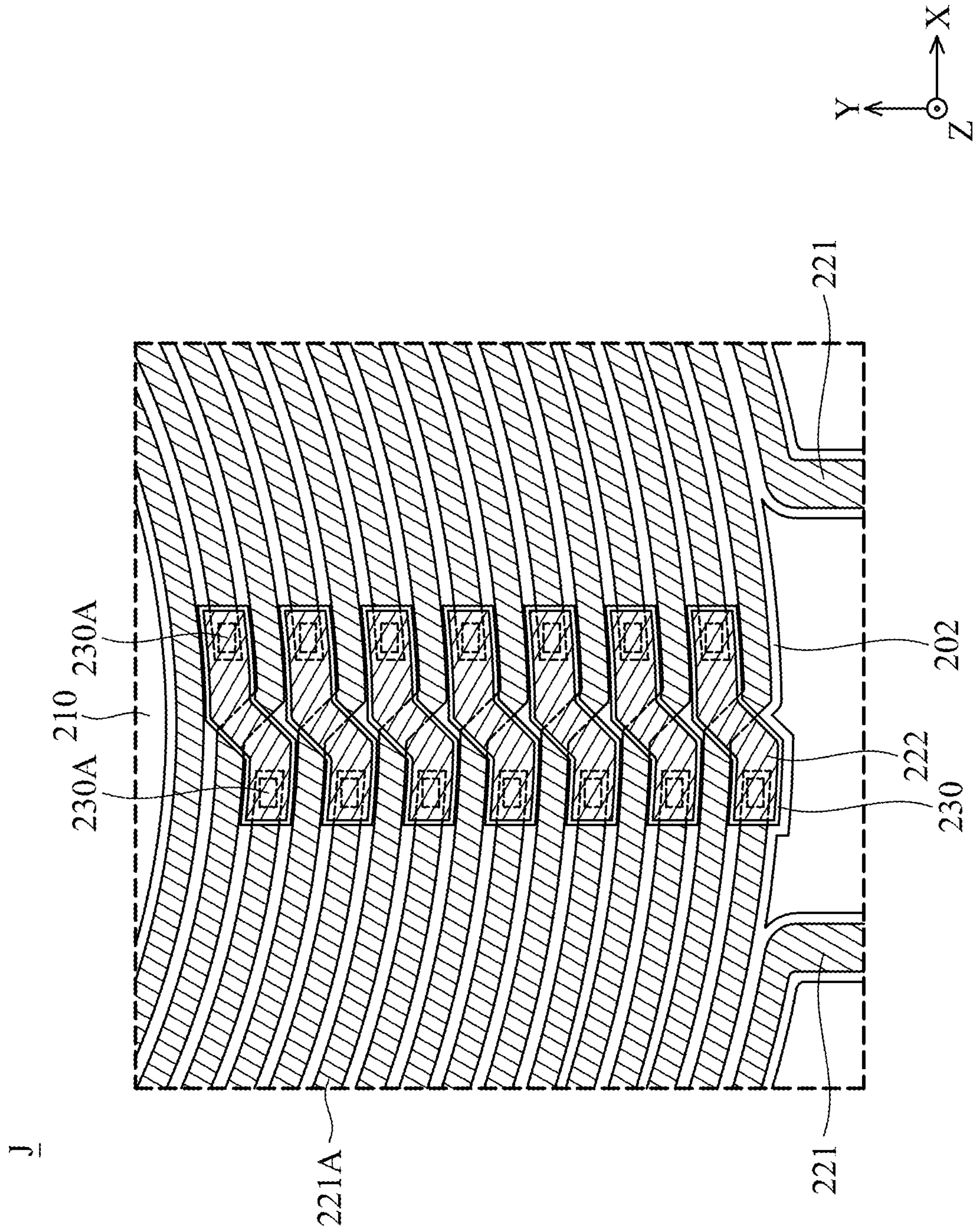
FIG. 7 illustrates an enlarged view of the area J shown in FIG. 6 in accordance with some embodiments.

The multi-layered coil structure 220 is embedded in the diaphragm 210, and includes a first metal layer 221 and a second metal layer 222, which are located on different horizontal planes, which may be parallel to the X-Y plane shown in FIG. 6. The difference between the micro speaker 20 and the micro speaker 10 shown in FIG. 1A is that the first metal layer 221 includes a plurality of coaxial segments 221A disposed around the central axis O of the diaphragm 210, and those coaxial segments 221A are electrically connected by the second metal layer 222. It should be appreciated that the multi-layered coil structure 220 is schematically illustrated in FIG. 6, and the detailed structure of the multi-layered coil structure 220 (such as the coaxial segments 221A) is shown in FIG. 7. Furthermore, the second metal layer 222 may also be symmetrically disposed around the central axis O of the diaphragm 210. For example, as shown in FIG. 6, the second metal layer 222 is distributed on both sides (e.g., the upper and lower sides shown) of the central axis O.

FIG. 7 illustrates an enlarged view of the area J shown in FIG. 6 in accordance with some embodiments. As shown in FIG. 7, the second metal layer 222 connects the separate coaxial segments 221A of the first metal layer 221. A dielectric layer 230 is disposed between the first metal layer 221 and the second metal layer 222 to prevent a short circuit between the first metal layer 221 and the second metal layer 222. Through holes 230A are formed in the dielectric layer 230, and the first metal layer 221 is electrically connected to the second metal layer 222 through the through holes 230A.

Figure 8:
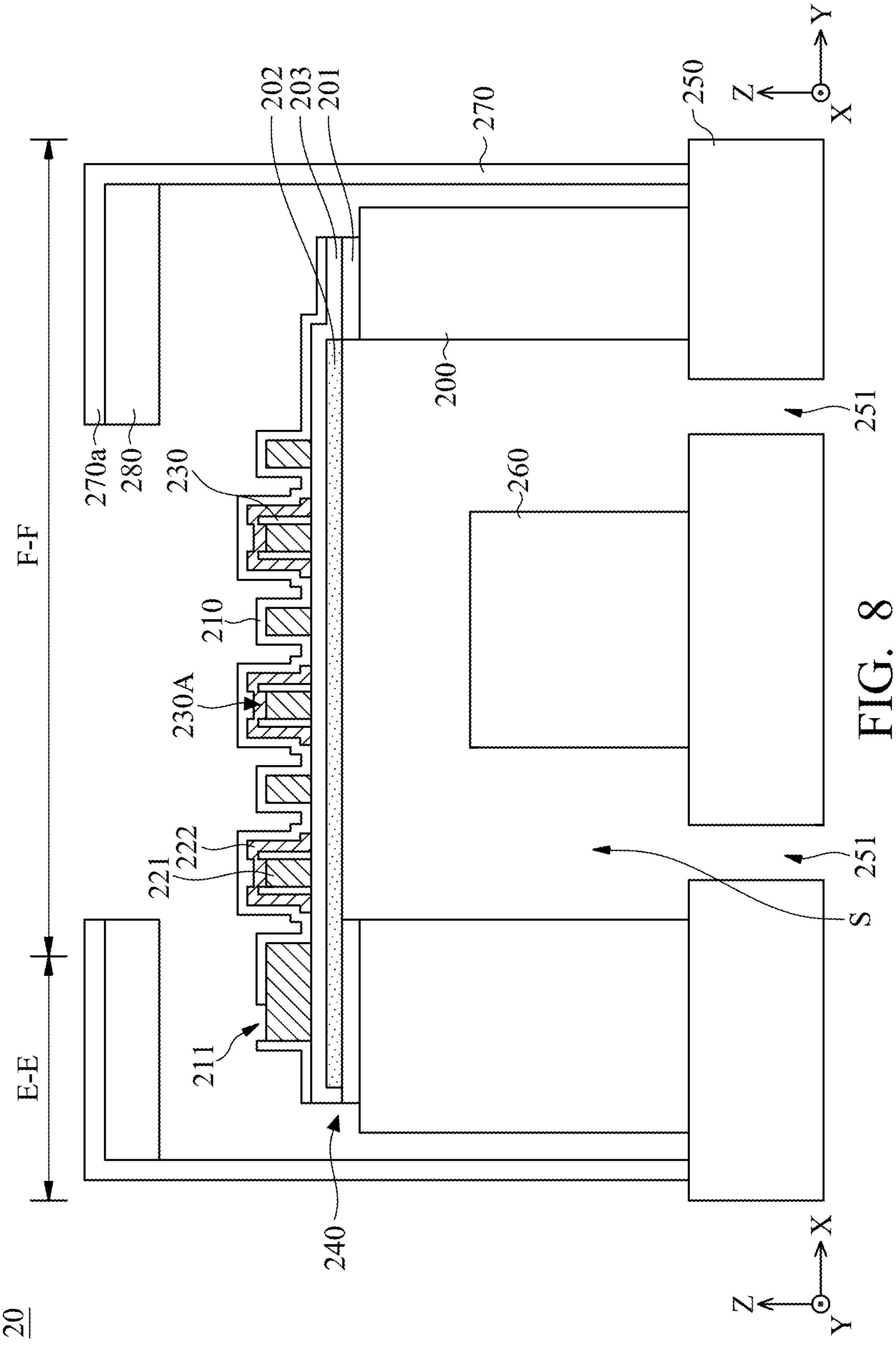
FIG. 8 illustrates a cross-sectional view of the package structure of the micro speaker shown in FIG. 6 in accordance with some embodiments.

FIG. 8 illustrates a cross-sectional view of the package structure of the micro speaker 20 shown in FIG. 6 in accordance with some embodiments. It should be noted that FIG. 8 includes cross-sectional views along lines E-E and F-F shown in FIG. 6. Two sets of coordinate axes are provided in FIG. 8, wherein one set of coordinate axes in the left-hand side correspond the cross-sectional view along line E-E, and the other set of coordinate axes in the right-hand side correspond the cross-sectional view along line F-F.

The detailed package structure of the micro speaker 20 is shown in FIG. 8. The manufacturing processes of the package structure of the micro speaker 20 are substantially the same as the manufacturing processes of the package structure of the micro speaker 10 described above, and the details thereof are not repeated here. In the example of FIG. 8, the second metal layer 222 is substantially uniformly distributed in the diaphragm 210 (e.g., symmetrically disposed around the central axis O of the diaphragm 210). In this way, when the diaphragm 210 vibrates/oscillates relative to the substrate 200, the distribution of the oscillating force may be more even. Therefore, the total harmonic distortion (THD) value of the micro speaker 20 can be reduced, and the lifetime of the micro speaker 20 can be longer. The etch stop metal layer 202, first permanent magnetic element 260 and the second permanent magnetic element 280 of the embodiments shown in FIG. 8 are similar to the etch stop metal layer 102, first permanent magnetic element 160 and the second permanent magnetic element 180 of the embodiments shown in FIG. 1B, respectively, and the details thereof are not repeated here. In addition, one or more dummy structures DS as illustrated in FIGS. 3C-1, 3D-1, 3E-1 and 4A to 4H may also be provided or embedded in the second portion 210B of the diaphragm 210 to enhance the flatness of the top surface of the diaphragm 210, thereby reducing the possibility of damaging the coil structure 220 below.

In summary, various embodiments of the present disclosure provide a package structure of a micro speaker and the method for forming the same. In the disclosed package structure, a permanent magnetic element is disposed under the diaphragm, and the magnetic field generated by the permanent magnetic element interacts with the current passing through the multi-layered coil structure to generate a force in the normal direction of the substrate to make the diaphragm vibrate to generate sound. There is another permanent magnetic element disposed above or under the package lid of the package structure in some embodiments. The permanent magnetic elements positioned above and under the diaphragm attract each other to increase the deflection of the planar magnetic field. Accordingly, the force generated by the current passing through the multi-layered coil structure and the planar magnetic field in the normal direction of the substrate increases, so that the diaphragm has a better frequency response, thereby improving the performance of the micro speaker.

In addition, during the manufacturing, the coil structure is formed on the semiconductor wafer and then covered with the diaphragm, so that the coil structure is embedded in the diaphragm. Also, one or more dummy structures are provided or embedded in the fixed part of the diaphragm around the coil structure to help disperse the stress on the top surface of the diaphragm to avoid large stress concentrations in localized area corresponding to the coil structure. This reduces the possibility of damaging the coil structure and improves the reliability of the package structure. Moreover, an etch stop metal layer is pre-formed on the semiconductor wafer before forming the coil structure, and the etch stop metal layer is designed to overlap the subsequently formed coil structure, so that the coil structure can be well protected during the etching process. This helps improve process yield and device/product reliability. Furthermore, due to the use of MEMS technology, the package structure of the micro speaker of the present disclosure also has the advantages of batch production, high consistency, high yield, small area, and low cost.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A package structure of a micro speaker, comprising:

a substrate having a hollow chamber;

a diaphragm disposed on a top surface of the substrate, wherein the diaphragm includes a first portion suspended over the hollow chamber and a second portion surrounding the first portion, wherein in a plan view, the second portion of the diaphragm and the hollow chamber do not overlap;

a coil structure embedded in the first portion of the diaphragm;

at least one dummy structure embedded in the second portion of the diaphragm, wherein the at least one dummy structure is electrically isolated from the coil structure by the diaphragm, wherein in a vertical direction that is perpendicular to the top surface of the substrate, a thickness of the at least one dummy structure is equal to a thickness of the coil structure; and a carrier board disposed on a bottom surface of the substrate opposite the top surface.

2. The package structure of the micro speaker as claimed in claim 1, wherein the diaphragm comprises polydimethylsiloxane (PDMS), phenolic epoxy resin, polyimide, or a combination thereof.

3. The package structure of the micro speaker as claimed in claim 1, wherein the at least one dummy structure comprises a semiconductor material, a dielectric material, a metal material, or a combination thereof.

4. The package structure of the micro speaker as claimed in claim 1, wherein the coil structure has a multi-layered structure, including a first metal layer, a second metal layer, and a dielectric layer interposed between the first metal layer and the second metal layer.

5. The package structure of the micro speaker as claimed in claim 4, wherein the at least one dummy structure has the same multi-layered structure as the coil structure.

6. The package structure of the micro speaker as claimed in claim 5, wherein in the vertical direction along which the first metal layer, the dielectric layer, and the second metal layer of the coil structure are stacked, the thickness of the at least one dummy structure is equal to the thickness of the coil structure.

7. The package structure of the micro speaker as claimed in claim 1, wherein the at least one dummy structure comprises a plurality of dummy structures evenly distributed in the second portion of the diaphragm.

8. The package structure of the micro speaker as claimed in claim 7, wherein each of the plurality of dummy structures has a square, rectangular, circular, hexagonal or curved shape.

9. The package structure of the micro speaker as claimed in claim 1, wherein the at least one dummy structure comprises a single and continuous dummy structure having a shape corresponding to a shape of the second portion of the diaphragm.

10. The package structure of the micro speaker as claimed in claim 1, wherein the coil structure comprises a first metal layer and a second metal layer, and wherein the first metal layer has a spiral structure surrounding a central axis of the diaphragm, and the second metal layer crosses over the spiral structure of the first metal layer and is electrically connected to the first metal layer.

11. The package structure of the micro speaker as claimed in claim 1, wherein the carrier board has at least one vent hole, and the at least one vent hole is configured to allow the hollow chamber to communicate with an external environment.

12. The package structure of the micro speaker as claimed in claim 1, further comprising:

a package lid wrapped around the substrate and the diaphragm, wherein the package lid has a lid opening that exposes a portion of a top surface of the diaphragm.

13. The package structure of the micro speaker as claimed in claim 1, further comprising:

a first permanent magnetic element disposed on the carrier board and in the hollow chamber; and a second permanent magnetic element disposed on the package lid, wherein the second permanent magnetic element is located below or above the lid opening.

14. The package structure of the micro speaker as claimed in claim 1, further comprising an etch stop layer disposed between the coil structure and the hollow chamber, wherein the etch stop layer overlaps the coil in the vertical direction that is perpendicular to the top surface of the substrate, and the etch stop layer is made of a metal material.

15. A method for forming a package structure of a micro speaker, comprising:

forming a coil structure on a top surface of a substrate, wherein forming the coil structure comprises:

forming a first metal layer on the top surface of the substrate;

forming a dielectric layer on the first metal layer; and forming a second metal layer on the dielectric layer;

forming at least one dummy structure on the top surface of the substrate;

forming a diaphragm covering the coil structure and the at least one dummy structure, wherein the coil structure is embedded in a first portion of the diaphragm, and the at least one dummy structure is embedded in a second portion of the diaphragm surrounding the first portion, wherein the at least one dummy structure is electrically isolated from the coil structure by the diaphragm, wherein forming the at least one dummy structure comprises forming the at least one dummy structure having the same multi-layered structure as the coil structure;

forming a hollow chamber in the substrate, wherein in a plan view, the coil structure is aligned with the hollow chamber, and the at least one dummy structure and the hollow chamber do not overlap;

attaching a carrier board to a bottom surface of the substrate opposite the top surface.

16. The method as claimed in claim 15, wherein the coil structure and the at least one dummy structure are formed by the same processes and the same materials.

17. The method as claimed in claim 15, wherein the coil structure and the at least one dummy structure have the same thickness in a vertical direction perpendicular to the top surface of the substrate.

18. The method as claimed in claim 15, wherein forming the at least one dummy structure comprises uniformly forming a plurality of discrete dummy structures in the second portion of the diaphragm.

19. The method as claimed in claim 15, further comprising:

mounting a package lid on the carrier board, wherein the package lid is wrapped around the substrate and the diaphragm, and has a lid opening that exposes a portion of the diaphragm.

20. The method as claimed in claim 15, wherein a first permanent magnetic element is mounted on the carrier board and positioned in the hollow chamber.

* * * * *